(12) United States Patent
Ando et al.

(10) Patent No.: US 7,138,205 B2
(45) Date of Patent: Nov. 21, 2006

(54) BATTERY WITH PROPORTIONAL COLLECTORS, STRAPS, AND PLATES

(75) Inventors: Kazunari Ando, Toyohashi (JP);
Akitoshi Hiramatsu, Toyokawa (JP);
Kenji Kimura, Sennan-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 219 days.

(21) Appl. No.: 10/260,189

(22) Filed: Sep. 30, 2002

(65) Prior Publication Data

US 2003/0087149 A1    May 8, 2003

(30) Foreign Application Priority Data

Oct. 2, 2001  (JP) .............................. 2001-306977
Oct. 22, 2001  (JP) .............................. 2001-324134
Oct. 25, 2001  (JP) .............................. 2001-328433

(51) Int. Cl.
*H01M 10/50*  (2006.01)
*H01M 4/00*   (2006.01)
*H01M 2/18*   (2006.01)

(52) U.S. Cl. ...................... 429/120; 429/128; 429/149; 429/233

(58) Field of Classification Search ................ 429/120, 429/128, 149, 233
See application file for complete search history.

(56) References Cited

U.S. PATENT DOCUMENTS

| 6,586,132 B1 | 7/2003 | Fukuda et al. |
| 2002/0028375 A1 | 3/2002 | Morishita et al. |

FOREIGN PATENT DOCUMENTS

| CN | 1178398 A | 9/1997 |
| CN | 1290046 A | 9/2000 |
| JP | 06-215804 | 8/1994 |
| JP | 9-213303 | * 8/1997 |
| JP | 2000-164186 | 6/2000 |
| JP | 2000-251950 | 9/2000 |
| JP | 2001-210331 | * 8/2001 |

OTHER PUBLICATIONS

Chinese Office Action dated May 21, 2004.

* cited by examiner

*Primary Examiner*—Dah-Wei Yuan
(74) *Attorney, Agent, or Firm*—Snell & Wilmer L.L.P.

(57) ABSTRACT

A battery comprises at least four cells each comprising a bath in the shape of a rectangular parallelepiped having a width direction dimension greater than a thickness direction dimension, and a power generation element, the power generation element being contained in the bath, the thickness direction sides of the cells facing each other, and the width direction sides of the cells being arranged side by side. A coolant for cooling the cells is allowed to flow along the width direction sides of the cells.

2 Claims, 32 Drawing Sheets

*Prior art*

Prior art

Prior art

BATTERY WITH PROPORTIONAL COLLECTORS, STRAPS, AND PLATES

BACKGROUND OF THE INVENTION

1. Field of the Invention

The present invention relates to a battery and, more particularly, to a battery in which a plurality of cells are linked so as to obtain a required power capacity.

2. Description of the Related Art

Large-capacity batteries comprising a plurality of linked cells, such as nickel-cadmium cells, nickel-hydrogen cells, or hydrogen cells, are used in various electric appliances, electric vehicles, and the like. In such a large-capacity battery, typically, a plurality of cells in the shape of a thin rectangular parallelepiped are arranged close to each other and bound together. In each cell, a plurality of positive electrode plates and a plurality of negative electrode plates are alternately laminated via separators containing electrolytic solution. For such a cell, when the ambient temperature is high or a large amount of current is discharged, heat is not sufficiently dissipated from the electrode plates contained in each cell, causing the temperature of the cell to be increased, potentially leading to a reduction in the life of the battery. In order to avoid such a problem, configurations described below have been proposed for cooling a large-capacity battery comprising a plurality of linked cells.

Japanese Laid-Open Publication No. 2000-164186 discloses a battery. In the battery, a plurality of cells (each cell being in the shape of a rectangular parallelepiped having a width direction dimension greater than a thickness direction dimension) are connected in series so that the sides along the width direction (width direction side) of the cells are located on the same plane. On the width direction side of each cell, a plurality of ribs are provided in a vertical direction. A coolant channel, through which a coolant is forced to flow, is provided between each rib in the vertical direction of the cell. Thereby, each cell is cooled.

Japanese Laid-Open Publication No. 6-215804 discloses a monoblock battery. The battery is in the shape of a rectangular parallelepiped. A side plate is provided along each of the wall surfaces in the width direction of the battery. A coolant channel (fluid circulation space) is provided between the wall surface and the side plate, and a coolant is supplied to the coolant channel.

Japanese Laid-Open Publication No. 2000-251950 discloses another battery. In the battery, a plurality of cells are linked and arranged so that the width direction sides of the cells face each other. A coolant channel is provided between each cell. Another coolant channel is provided on the sides in the thickness direction of the cells for allowing the coolant channels to communicate with each other. A coolant is allowed to flow through the coolant channel.

However, the configuration disclosed in Japanese Laid-Open Publication No. 2000-164186 described above requires an additional structure for distributing the coolant to the coolant channels of the cells. For this reason, the configuration of the entire battery is complicated and therefore the number of assembling steps is increased, causing an increase in cost.

In the configuration of Japanese Laid-Open Publication No. 6-215804 described above, only the sides of the battery comprising a plurality of linked cells are cooled. Therefore, when a great load is applied to the battery and therefore the amount of heat generated is great, it is difficult to obtain a sufficient cooling effect. Therefore, in order to obtain a sufficient cooling effect, the battery requires an additional structure for distributing the coolant to the coolant channels of the cells. As in Japanese Laid-Open Publication No. 2000-164186, the configuration of the entire battery is complicated and therefore the number of assembling steps is increased, causing an increase in cost.

In the configuration of Japanese Laid-Open Publication No. 2000-251950 described above, the coolant is allowed to flow mainly in the thickness direction side of each cell, and the amount of the coolant flowing through the coolant channel provided between each cell is small. In each cell, a plurality of electrode plates are alternately laminated, and the electrode plates are arranged along the width direction side of the cell. In addition, space is provided between the thickness direction side and the electrode plate so as to facilitate production of the battery. In order to obtain higher cooling efficiency, it is necessary to allow the coolant to flow along the width direction side. However, in this configuration, the coolant is allowed to flow mainly along the thickness direction side and therefore a sufficient level of cooling efficiency cannot be obtained.

As described in this publication, a plurality of cells are arranged so that the width direction sides face each other, and are integrally bound. The cells provided on the ends of the battery receive a smaller level of pressure. In such cells, therefore, electrolytic solution is likely to be dried up, so that the life of the cells is significantly smaller than that of the other cells. This situation will be specifically described below.

FIG. 40 is a schematic diagram showing a configuration of a conventional battery. FIG. 41 is a diagram for explaining expansion of the cell in the conventional battery. Referring to FIG. 40, the conventional battery 400 comprises 6 cells 401, 402, 403, 404, 405, and 406, each of which is in the shape of a rectangular parallelepiped in which the width direction dimension is greater than the thickness and height direction dimensions. The cells are arranged so that the width direction sides thereof face each other, and are integrally bound. In each cell, a plurality of electrode plates (positive electrode plates and negative electrode plates) are laminated, and arranged along the width direction sides of the cells. In the battery 400 having the above-described configuration, when discharging cycles are repeated in each cell 401 to 406, each electrode plate expands. Therefore, as shown in FIG. 41, the cells 401 to 406 expand in a direction away from the cells 403 and 404 provided at the center, toward the outside. In this case, for the cells 401 to 406, the further out the location of the cell, the smaller the binding force applied to the cell, therefore, the greater the expansion of the cell.

When the cells 401 to 406 expand in this manner, the outer cells expand to a greater extent. Therefore, the further out the cell, the smaller the pressure acting on the electrode plate. If the pressure acting on the electrode plate becomes small, the distance between adjacent electrode plates becomes great, causing the electrolytic solution to splash so that the electrolytic solution is likely to be dried up.

FIG. 42 is a graph showing the life characteristics of cells in a conventional battery. As described above, the further out the cell, the smaller the pressure applied to the cell. Therefore, the pressure acting on the cells 401 and 406 located on the ends of the battery are small as compared to that acting on the other cells 402 to 405, whereby the electrolytic solution is likely to be dried up. Consequently, as shown in FIG. 42, the life of the cells 401 and 406 on the ends of the battery is significantly smaller than the life of the other cells 402 to 405, causing variations in the life of the cells in the battery.

In order to suppress the expansion of the cells 401 to 406, a configuration has been proposed, in which as shown in FIG. 43, expansion suppressing plates 411 and 412 are provided on the respective ends of the battery. The expansion suppressing plates 411 and 412 integrally bind all of the cells 401 to 406. Despite this configuration, the expansion of the cells 401 and 406 provided on the ends of the battery cannot be sufficiently suppressed.

FIG. 44 is a graph showing a temperature distribution of the cells when the battery shown in FIG. 40 is employed in an EV (electric vehicle). When the battery of FIG. 40 is applied to an EV in which a large amount of current may be input or output, variations in temperature between each cell 401 to 406 are large as shown in FIG. 44. Points 401B to 406B indicate the temperatures of the cells 401 to 406, respectively. The temperatures of the cells 403 and 404 provided at the middle of the battery are high. The closer the location of the cell to the opposite ends of the battery, the lower the temperature of the cell. Thus, the variations in temperature between the cells 401 to 406 are large, and the temperatures of the cells provided in the middle are higher. In this case, corrosion of the grid-like electrode plate and degradation of active substances provided in the electrode plate are accelerated, causing an early reduction in the output voltage of the cell, so that the life of the battery is reduced.

In each of the above-described conventional batteries, a liquid coolant, such as water, is used as a coolant for cooling the linked cells at predetermined positions. Power generation elements composed of positive electrode plates, negative electrode plates and separators are completely shielded from the coolant channels in order to prevent the liquid coolant from penetrating into the power generation elements.

For example, in Japanese Laid-Open Publication No. 6-215804 described above, a plastic material case comprising a bath having an open top, which contains power generation elements, such as electrode plates, and a lid attached to a top portion of the bath, seals the power generation elements so that the power generation elements are shielded from the coolant channel.

In Japanese Laid-Open Publication No. 2000-251950 described above, a plurality of cells are integrally linked in series to construct a sealed secondary battery. A lid member is attached to a top portion of the sealed secondary battery, whereby power generation elements in the cells are sealed, and shielded from a cooling channel.

However, in these publications, the lid is attached to the bath containing the cells, although positioning means for attaching the lid to an appropriate position is not provided. Therefore, it is not easy to appropriately position the lid with respect to the bath. If the lid is not correctly positioned with respect to the bath, the cells are not effectively cooled by the coolant. Also, when the battery is used in a situation where wobble or the like may occur, the lid is displaced from the bath, whereby the coolant is likely to penetrate into the power generation element.

The portion of the battery, which generates heat, is not limited to the electrode plate. In particular, when a terminal portion, which is externally connected, excessively generates heat, a portion around the terminal of the bath containing the cells may be melted. However, in the above-described publications, the electrode plate is mainly cooled by the coolant, but the battery is not provided with an arrangement for preventing the heat generation of the terminal portion.

Next, a problem with the internal structure of conventional batteries having a configuration in which positive electrode plates and negative electrode plates are laminated via separators will be described below.

FIG. 45 is a perspective view showing an exemplary internal structure of a conventional battery 1.

A battery 501 has a case body 502 which is in the shape of a hollow rectangular parallelepiped and has an open top. The internal space of the case body 502 is divided by a partition 503 into three in a longitudinal direction and two in a width direction, i.e., 6 cells 502a to 502f. The cells 502a to 502f each have a cross section in the shape of a rectangle extending in the longitudinal direction of the case body 2.

The cells 502a to 502f each contain a unit power generation element having a plurality of positive electrode plates (e.g., $PbO_2$ plate), each of which has a similar planar shape, and a plurality of negative electrode plates (e.g., Pb plate), each of which also has a similar planar shape. In the unit power generation element, positive electrode plates and negative electrode plates are alternately laminated via separators made of porous, extremely fine glass fibers holding dilute sulfuric acid, or the like.

At one end of the case body 502, the first cell 502a and the sixth cell 502f are disposed side by side in the width direction of the case body 502. The first cell 502a, the second cell 502b and the third cell 502a are disposed side by side in a longitudinal direction of the case body 502. The third cell 502a and the fourth cell 502d are disposed side by side in the width direction of the case body 502. The fifth cell 502e is disposed between the fourth cell 502d and the sixth cell 502f. The positive electrode plates and the negative electrode plates of the unit power generation element of each cell 502a to 502f each extend in the longitudinal direction of the case body 502.

All of the positive electrode plates of each unit power generation element of the second cell 502b to the fifth cell 502e (i.e., excluding the first cell 502a and the sixth cell 502f) are connected to a first strap 504 provided on one side of the positive electrode plate. All of the negative electrode plates of each unit power generation element are connected to a second strap 504 provided on a side of the negative electrode plate opposite to the first strap 504 provided on the side of the positive electrode plate. The first strap 504 is conductive to all of the positive electrode plates, while the second strap 504 is conductive to all of the negative electrode plates.

All of the positive electrode plates of the unit power generation element contained in the first cell 502a are connected to the strap 504, while all of the negative electrode plates are connected to a terminal member 505. All of the negative electrode plates of the unit power generation element contained in the sixth cell 502f are connected to the strap 504, while all of the positive electrode plates are connected to the terminal member 505.

The strap 504 connected to the negative electrode plate of the unit power generation element contained in the first cell 502a, is interconnected to the strap 504 which is connected to the positive electrode plates of unit power generation element contained in the second cell 502b, via a through hole provided in the partition 503. As shown in FIG. 45, the strap 504 connected to the negative electrode plates of the unit power generation element in the second cell 502b, is interconnected to the strap 504 connected to the positive electrode plates of the unit power generation element in the third cell 502c, via a through hole provided in the partition 503. The strap 504 connected to the negative electrode plates of the unit power generation element in the third cell 502c, is interconnected to the strap 504 connected to the positive electrode plates of the unit power generation element in the fourth cell 502d, next to the third cell 502c in the width direction of the case body 502, via a through hole provided in the partition 503.

The strap 504 connected to the negative electrode plates of the unit power generation element in the fourth cell 502d, is interconnected to the strap 504 connected to the positive electrode plates of the unit power generation element in the fifth cell 502e, via a through hole provided in the partition 503. The strap 504 connected to the negative electrode plates of the unit power generation element in the fifth cell 502e, is interconnected to the strap 504 of the positive electrode plates of the unit power generation element in the sixth cell 502f, via a through hole provided in the partition 503. Thus, the unit power generation elements contained in the cells 502a to 502f are connected in series. The terminal member 505 connected to the unit power generation element in the first cell 502a is a positive terminal, while the terminal member 505 connected to the unit power generation element in the sixth cell 502f is a negative terminal.

FIG. 45 is a front view of an electrode plate 510 constituting the positive electrode plate or the negative electrode plate contained in the cells 502a to 502f of the conventional battery 501. The electrode plate 510 has a rectangular electrode plate body 513 and a rectangular collector 511 which is provided at a side of the electrode plate body 513, and projects from the electrode plate body 513 upward. The collector 511 is provided at the side edge of the electrode plate body 513, leaving an appropriate spacing with respect to an end of the side of the electrode plate body 513, and also leaving an appropriate spacing with respect to the center of the side of the electrode plate body 513.

The thus-constructed electrode plate 510 is used in a manner as shown in FIG. 46A. Specifically, a pair of the electrode plates 510 are attached together via a separator, where the collectors 511 are positioned on the opposite sides, i.e., one of the electrode plates 510 is turned from side to side (by 180°) and is then attached to the other electrode plate 510 to obtain a positive electrode plate and a negative electrode plate.

In the unit power generation elements contained in the second cell 502b to the fifth cell 502e, as shown in FIG. 46B, one strap 504 is connected by welding to the collectors 511 of all of the electrode plates 510 constituting the positive electrode plates, while the other strap 504 is connected to the collectors 511 of all of the electrode plates 510 constituting the negative electrode plates.

As shown in FIG. 47, the strap 504 has an electrode plate connector 504a, which is in the shape of a plate and is attached by welding to a top edge of the collector 511 provided in the electrode plate 510, and an inter-cell connector 504b which is bent extending upward from a side of the electrode plate connector 504a. The electrode plate connector 504a is attached by welding to the collector 511 of the electrode plate 510 constituting a positive electrode plate or a negative electrode plate, where the inter-cell connector 504b is disposed along the partition 503 provided between the adjacent cells.

The collector 511 provided in the electrode plate 510 is made of the same material as that of the electrode plate 510 (e.g., lead (Pb) or lead oxide ($PbO_2$)). Therefore, the collector 511 has a considerably large weight. It is preferable to reduce the width direction length of the collector 511 in order to reduce the weight of the collector 511.

However, the strap 504 provided on the top portion of the collector 511 has to have a width direction length greater than the width direction length of the collector 511. If the width direction length of the collector 511 is excessively smaller than the width direction length of the strap 504, damage, such as rupture, may occur around the collector 511 due to wobble or the like. Therefore, an appropriate ratio of the width direction length of the strap 504, to the width direction length of the collector 511, is important in order to avoid damage, such as rupture, and to reduce the weight of the battery.

When the width direction length of the strap 504 provided on the top end of the collector 511 is excessively small as compared to the width direction length of the electrode plate 510, the resistance of the strap 504 is high and a voltage drop is large in the case of discharging a large amount of current. Therefore, an appropriate ratio of the width direction length of the strap 504 to the width direction length of the electrode plate 510 is important in order to prevent a voltage drop.

SUMMARY OF THE INVENTION

According to one aspect of the present invention, a battery comprises at least four cells each comprising a bath in the shape of a rectangular parallelepiped having a width direction dimension greater than a thickness direction dimension, and a power generation element, the power generation element being contained in the bath, the thickness direction sides of the cells facing each other, and the width direction sides of the cells being arranged side by side. A coolant for cooling the cells is allowed to flow along the width direction sides of the cells.

In one embodiment of this invention, the flow of the coolant is branched into the thickness direction sides between the adjacent cells.

In one embodiment of this invention, the battery according further comprises a cooling box. The cells are contained in the cooling box, and a coolant channel is formed between an inner wall surface of the cooling box and the width direction sides of the cells, and between the width direction sides of the cells facing each other.

In one embodiment of this invention, a coolant channel is formed between the thickness direction sides of the cells facing each other.

In one embodiment of this invention, a coolant channel is formed between outer bottom sides of the baths and an inner bottom side of the cooling box.

In one embodiment of this invention, the outer bottom side of each bath is provided with a first depression or a first protrusion, and the inner bottom side of the cooling box is provided with a second protrusion or a second depression which is engaged with the first depression or the first protrusion.

In one embodiment of this invention, the inner wall surface of the cooling box facing the width direction sides of the cells is provided with first ribs for forming a coolant la channel. The width direction sides of the cells facing the inner wall surface of the cooling box are provided with second ribs for forming a coolant channel. The first ribs are abutted to the second ribs.

In one embodiment of this invention, the first ribs are attached to the second ribs by welding with sonication.

In one embodiment of this invention, each second rib is a protrusion and the protrusions are provided on the entire width direction side of each cell.

In one embodiment of this invention, the second ribs are arranged to form a channel such that the coolant is allowed to flow uniformly on the entire width direction side of each cell.

In one embodiment of this invention, the second ribs are in the shape of a line and divide the width direction side of each cell into a plurality of regions, and the plurality of regions are in communication with each other.

In one embodiment of this invention, each second rib has a cross section in the shape of any of a rectangle, a triangle, and a curve.

In one embodiment of this invention, the coolant is liquid.

In one embodiment of this invention, the power generation element comprises electrode plates laminated in parallel to the width direction side of the cell.

In one embodiment of this invention, the battery further comprises a battery case and a lid. The cells are integrally bound with the battery case, and are contained in the cooling box. The cooling box is sealed with the lid.

In one embodiment of this invention, the bath, the battery case, the lid and the cooling box are made of a synthetic resin. The bath is attached to the battery case by welding or adhesion. The lid is attached to the battery case and the cooling box by welding or adhesion.

According to another aspect of the present invention, a battery comprises a plurality of cells comprising a power generation element, in which a plurality of positive electrode plates and a plurality of negative electrode plates are alternately laminated via separators in the power generation element, a battery case integrally binding top portions of the cells, in which the cells are electrically connected to each other, a cooling box containing the cells and the battery case, in which a coolant channel is formed on sides of the cells, and a lid attached to a top portion of the cooling box, sealing the cells and the battery case contained in the cooling box. The lid is provided with battery terminals which are respectively connected to a positive terminal and a negative terminal of the cells. The battery case is provided with depressions, and the lid is provided with protrusions, the depressions being engaged with the corresponding protrusions.

In one embodiment of this invention, the battery case is integrally attached to the lid by welding.

In one embodiment of this invention, the battery case is integrally attached to the lid by adhesion.

In one embodiment of this invention, the battery terminals are provided on the lid by insert molding, and are cooled with the coolant in the cooling box.

According to another aspect of the present invention, a battery comprises positive electrode plates, negative electrode plates, and separators. The positive electrode plates and the negative electrode plates are alternately laminated via the separators. The positive electrode plates and the negative electrode plates each comprises an electrode plate body and a collector provided on the electrode plate body, the collectors of the positive electrode plates are attached to a first strap, and the collectors of the negative electrode plates are attached to a second strap. A length A of the collector of each electrode plate, a length W of the first and second straps along the collector, and a length X of the electrode plate body satisfy:

A>W/2, and

X/5≦W<X/2.

Thus, the invention described herein makes possible the advantages of providing: (1) a battery comprising a plurality of linked cells, in which each has a high level of cooling efficiency, cost for cooling each cell is low, and substantially no variation occurs in the life of each cell; (2) a battery, in which a battery case containing cells can be positioned with respect to a lid, and it is possible to prevent heat generation around terminals; and (3) a battery, in which the weight of the battery can be reduced while preventing damage, such as rupture, of a collector, and the width direction lengths of a strap and a collector can be appropriately adjusted so as to prevent voltage drop due to the increased high resistance of the strap.

These and other advantages of the present invention will become apparent to those skilled in the art upon reading and understanding the following detailed description with reference to the accompanying figures.

DESCRIPTION OF THE PREFERRED EMBODIMENTS

Hereinafter, a battery according to the present invention will be described with reference to the accompanying drawings.

EXAMPLE 1

Figure 1:
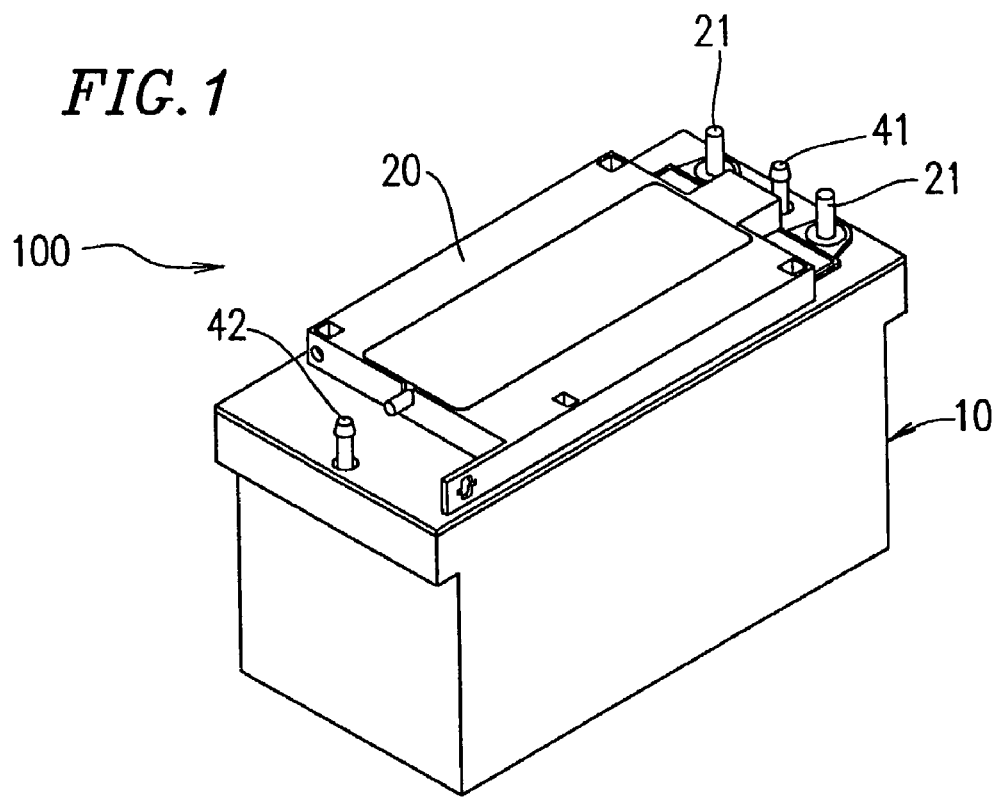
FIG. 1 is a perspective view showing a battery according to Example 1 of the present invention, when viewed in a slanted direction from the front.
Figure 2:
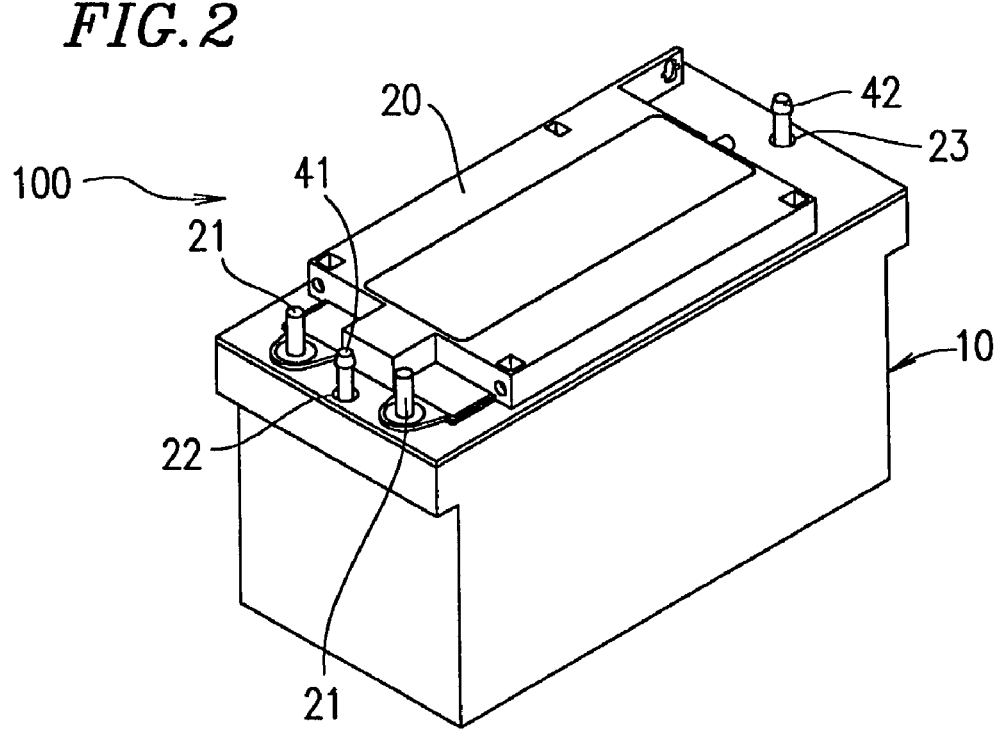
FIG. 2 is a perspective view showing the battery of Example 1, when viewed in a slanted direction from the rear.

FIG. 1 is a perspective view showing a battery 100 according to Example 1 of the present invention, when viewed in a slanted direction from the front. FIG. 2 is a perspective view showing the battery 100, when viewed in a slanted direction from the rear. The battery 100 contains a plurality of cells. The cells are cooled with high cooling efficiency. The battery 100 comprises a cooling box 10 for cooling the cells and a lid 20 for sealing the cooling box 10. The cooling box 10 and the lid 20 are made of a synthetic resin.

Figure 3:
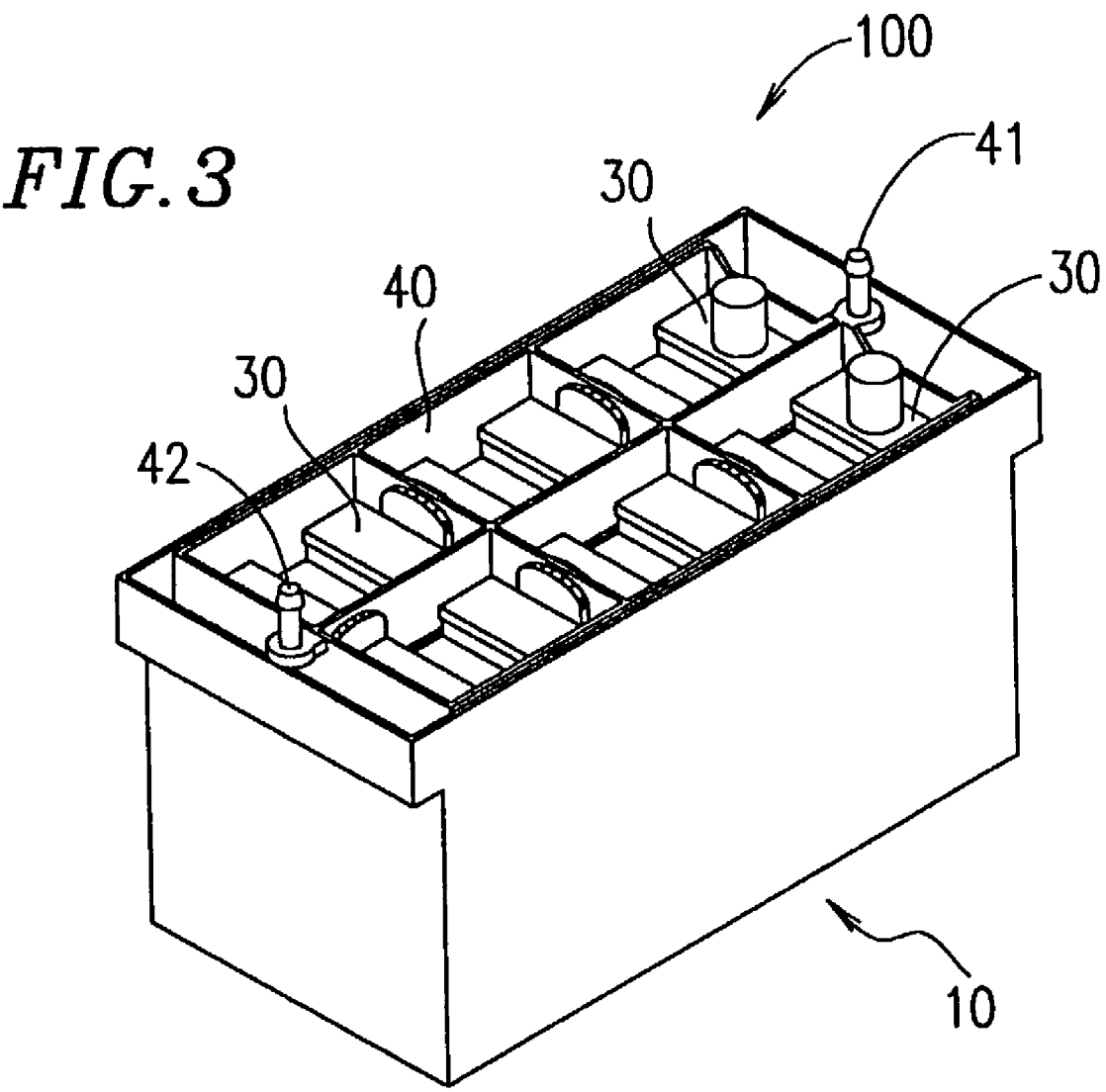
FIG. 3 is a perspective view showing the battery of Example 1, where a lid is removed from a cooling box.

FIG. 3 is a perspective view showing a battery 100 (note that the lid 20 is removed from the cooling box 10). In the cooling box 10, 6 cells 30, which are arranged in a matrix of 3 rows×2 columns and connected in series, are integrally contained in a frame-like battery case 40. The battery case 40 is made of a synthetic resin. The battery case 40 is provided with an inlet orifice 41 and an outlet orifice 42, through which cooling water, which is a coolant for cooling the cells 30, is injected or drained, at corresponding end portions thereof. The orifices 41 and 42 are each in the shape of a cylinder and project upward.

Figure 4:
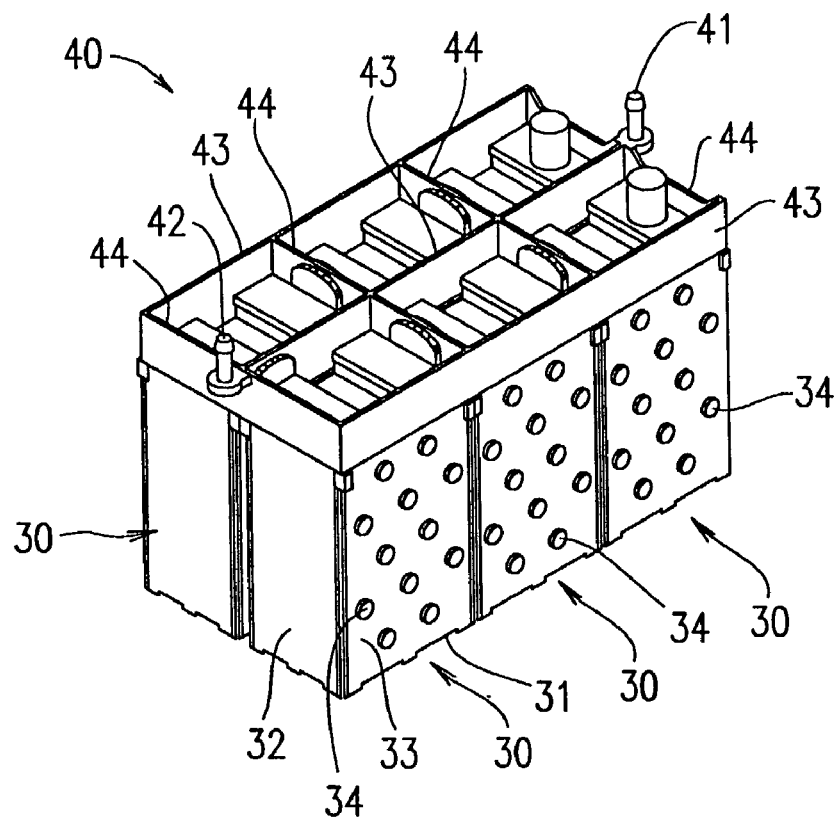
FIG. 4 is a perspective view showing a battery case of the battery of Example 1, with which a plurality of cells are integrated.
Figure 5:
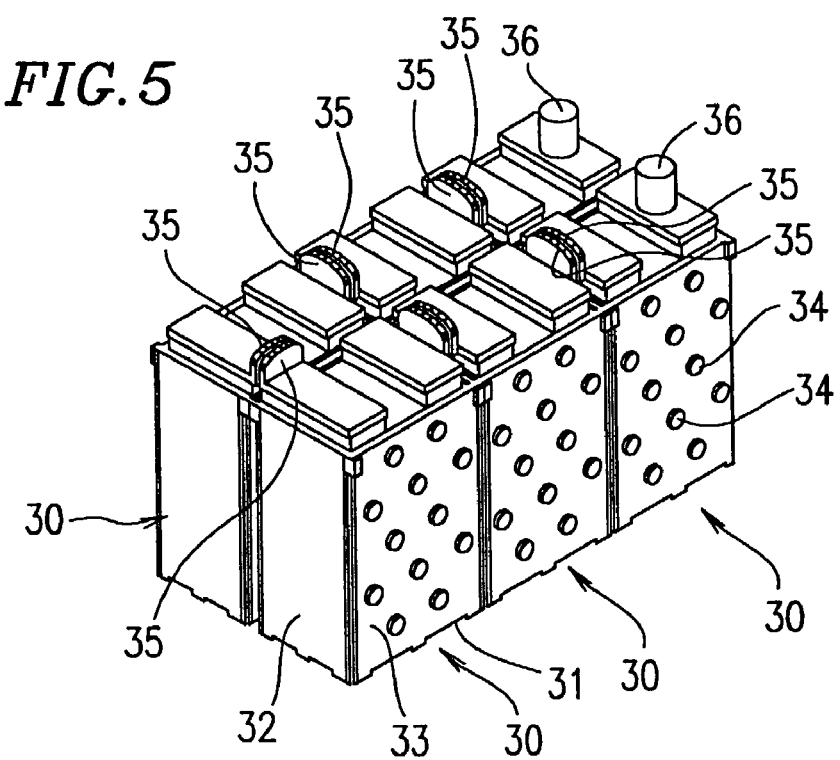
FIG. 5 is a perspective view showing an outer appearance of a plurality of linked cells in the battery of Example 1.

FIG. 4 is a perspective view showing the battery case 40 in which the cells 30 are arranged in a matrix of 3 rows×2 columns and are integrally linked. FIG. 5 is a perspective view showing the cells 30 in a matrix of 3 rows×2 columns, where the battery case 40 is removed.

As shown in FIG. 5, each of the cells 30 comprises a bath 31 containing a power generation element comprising positive electrode plates, negative electrode plates and separators. Each bath 31 is in the shape of a thin rectangular parallelepiped having a greater width direction dimension than a thickness direction dimension, and having a thickness direction side 32 and a width direction side 33 which has a greater width than that of the thickness direction side 32. The bath 31 is made of a synthetic resin. The bath 31 contains a power generation element in which a plurality of positive electrode plates and a plurality of negative electrode plates are alternately laminated via grid-like separators holding dilute sulfuric acid or the like. The positive electrode plates and the negative electrode plates are in parallel to the width direction side 33. The width direction side 33 of the bath 31 is provided with a plurality of protrusions 34, which are in the shape of a cylinder and are uniformly distributed with predetermined spacing.

As shown in FIG. 4, the battery case 40 comprises a pair of width direction side holding portions 43 and a pair of thickness direction side holding portions 44, which form the shape of a rectangular frame, so that top portions of the cells 30 in a matrix of 3 rows×2 columns are integrally bound. The inner space of the rectangular frame-like battery case 40 is divided equally into 3 portions in the longitudinal direction by a pair of thickness direction side holding portions 44, and is also divided equally into 2 portions in the width direction by a width direction side holding portion 43, thereby providing 3×2 hollow portions. The top portions of the cells 30 are fitted into the corresponding hollow portions. The battery case 40 is attached to the baths 31 of the cells 30 by welding or adhesion.

Referring to FIGS. 4 and 5, the three cells 30 forming a row are arranged so that the thickness direction sides 32 face each other, and the two cells 30 forming a column are arranged so that the width direction sides 33 face each other.

The four cells 30 other than the pair of cells 30 forming a row at an end of the battery are each provided with a positive electrode plate side strap 35 which is attached to all of the positive electrode plates in the bath 31, and a negative electrode plate side strap 35 which is attached to all of the negative electrode plates in the bath 31. Each strap 35 has an L-shaped cross section. The two cells 30 of the four cells 30 adjacent to each other in the column direction are connected in series, where the positive electrode plate side strap 35 of one of the two cells 30 is electrically connected to the negative electrode plate side strap 35 of the other cell 30, via a through hole provided in the thickness direction side holding portions 44 between the cells 30.

Among the four cells 30, a pair of cells 30 forming a row at the other end of the battery are connected in series, where the positive electrode plate side strap 35 of one of the cells 30 is electrically connected to the negative electrode plate side strap 35 of the other cell 30 via a through hole provided in the width direction side holding portions 43 between the cells.

One of the pair of cells 30 forming a row at the end of the battery is provided with a positive electrode plate side strap 35, which is connected to all of the positive electrode plates contained in the bath 31, and a negative electrode plate side terminal 36, which is connected to all of the negative electrode plates contained in the bath 31, at a top portion thereof. The other cell 30 is provided with a negative electrode plate side strap 35, which is connected to all of the negative electrode plates contained in the bath 31, and a positive electrode plate side terminal 36, which is connected to all of the positive electrode plates contained in the bath 31, at a top portion thereof.

These cells 30 are connected in series, where the positive electrode side strap 35 in one of the cells 30 is electrically connected to the negative electrode side strap 35 in the other cell 30 adjacent to the one cell 30 in the column direction, via a through hole provided in the thickness direction side holding portion 44 between the cells, and where the negative electrode side strap 35 of the other cell 30 is electrically connected to the positive electrode side strap 35 in the one cell 30 adjacent to the other cell 30 in the column direction, via a through hole provided in the thickness direction side holding portions 44 between the cell. Thus, the 6 cells 30 arranged in a matrix of 3 rows×2 columns are connected along a U-shape in series.

The inlet orifice 41 and the outlet orifice 42 are provided outwardly from the middle of the respective thickness direction side holding portions 44 at the ends of the battery case 40.

Figure 6:
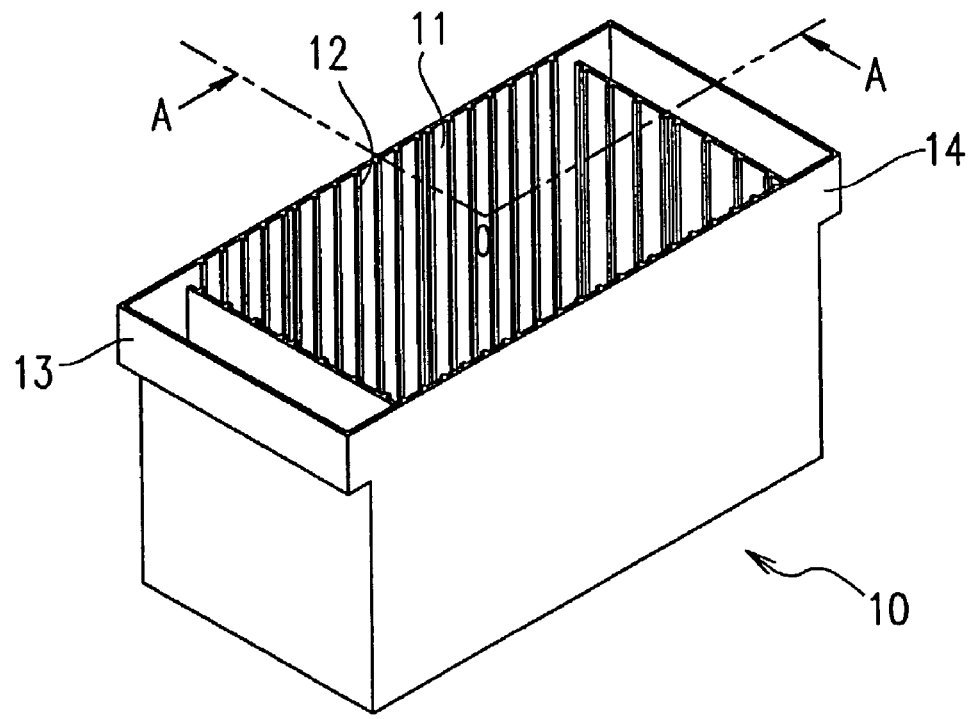
FIG. 6 is a perspective view showing an outer appearance of a cooling box in the battery of Example 1.

FIG. 6 is a perspective view showing the cooling box 10. The cooling box 10 is in the shape of a substantially hollow rectangular parallelepiped and has an open top. The 3×2-matrix cells 30 integrally bound in the battery case 40 are inserted into the cooling box 10 through the open top thereof. There is appropriate spacing between the inserted cells 30 and an inner wall surface 11 of the cooling box 10. On the inner wall surface 11 of the cooling box 10, a plurality of ribs 12 extending vertically are spaced parallel at appropriate intervals. The protrusions 34 provided on the width direction side 33 of the bath 31 of the cell 30 contained in the cooling box 10 are abutted to the vertically-extending ribs 12 provided on the inner wall surface 11 of the cooling box 10, followed by welding using sonication. Thereby, space extending vertically is formed between the inner wall surface 11 of the cooling box 10 and each cell, by the ribs 12 on the inner wall surface 11 of the cooling box 10 and the protrusions 34 of the cells 30.

Figure 7:
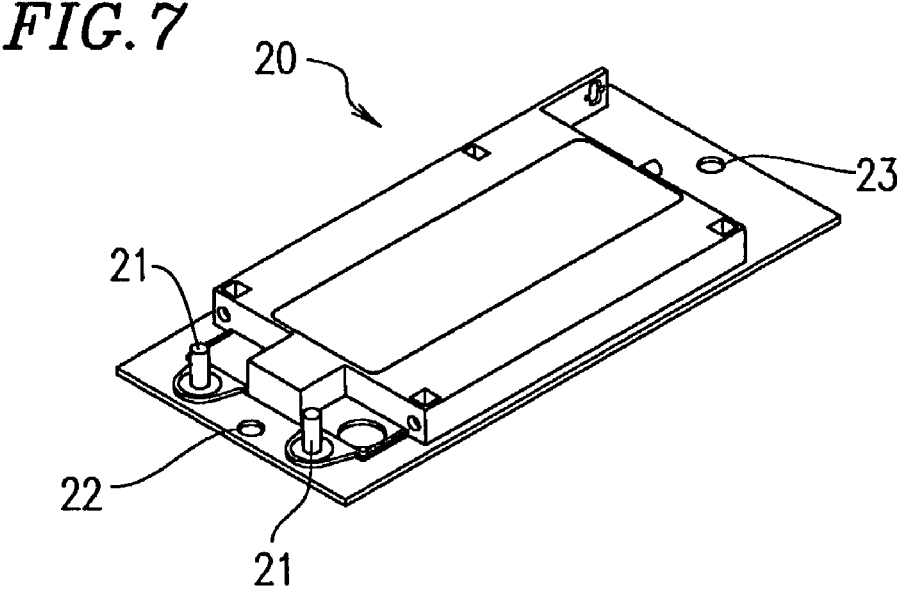
FIG. 7 is a perspective view showing an outer appearance of a lid in the battery of Example 1.

FIG. 7 is a perspective view showing the lid 20 when viewed from the same direction as that in FIG. 2. On an end of the lid 20, two battery terminals 21 projecting upward are provided for connecting the cells 30 connected in series in the 3×2 matrix to the outside of the battery 100. The battery terminals 21 are also electrically connected to the respective terminals 36 of the pair of cells 30 provided at the end of the cooling box 10. The lid 20 is also provided with orifice holding holes 22 and 23, through which the projecting inlet orifice 41 and outlet orifice 42 provided on the battery case 40 are respectively passed, at respective ends thereof.

After the battery case 40 containing the 6 cells 30 bound integrally is inserted into the cooling box 10 from the top thereof, the lid 20 is attached to the top of the battery case 40 in the cooling box 10. In this situation, as shown in FIG. 2, the inlet orifice 41 and the outlet orifice 42 are passed through the respective orifice holding holes 22 and 23 provided in the lid 20. The lid 20 is attached to the battery case 40 and the cooling box 10 by welding or adhesion.

Figure 8:
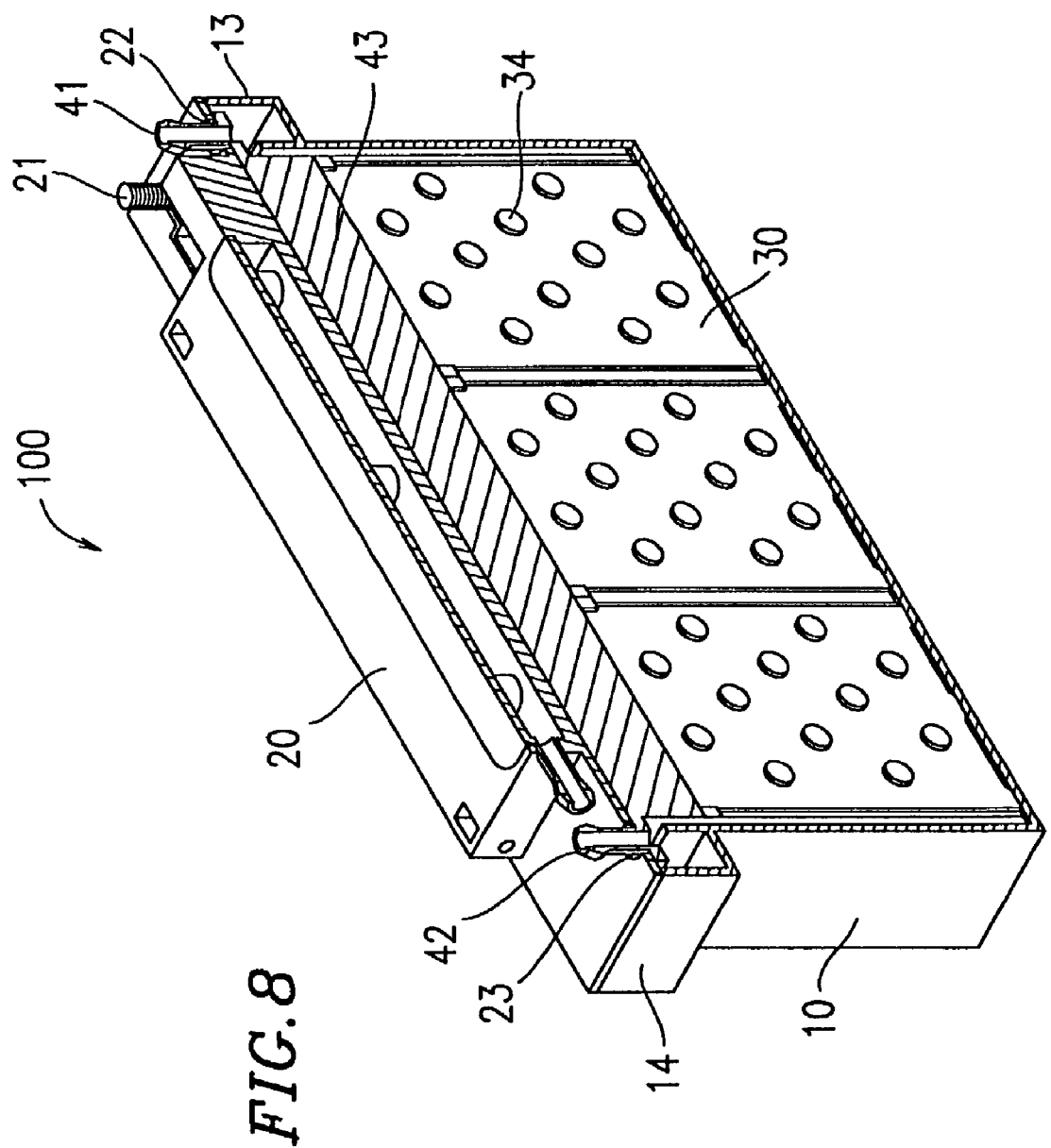
FIG. 8 is a perspective view showing a longitudinal cross section of the cooling box in which the battery case is inserted and to which the lid is attached according to Example 1.
Figure 9:
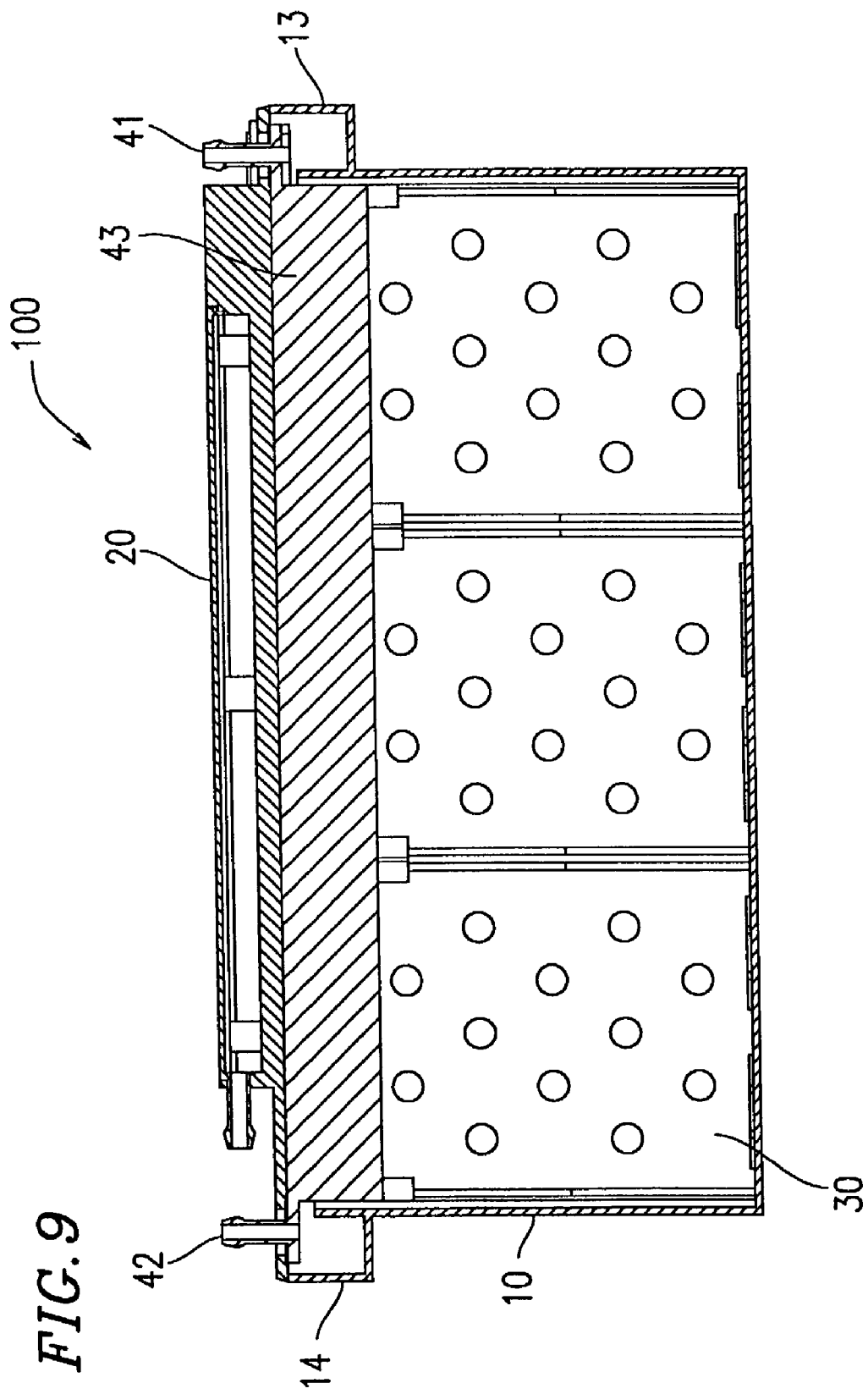
FIG. 9 is a longitudinal cross section of the cooling box in which the battery case is inserted and to which the lid is attached according to Example 1.
Figure 10:
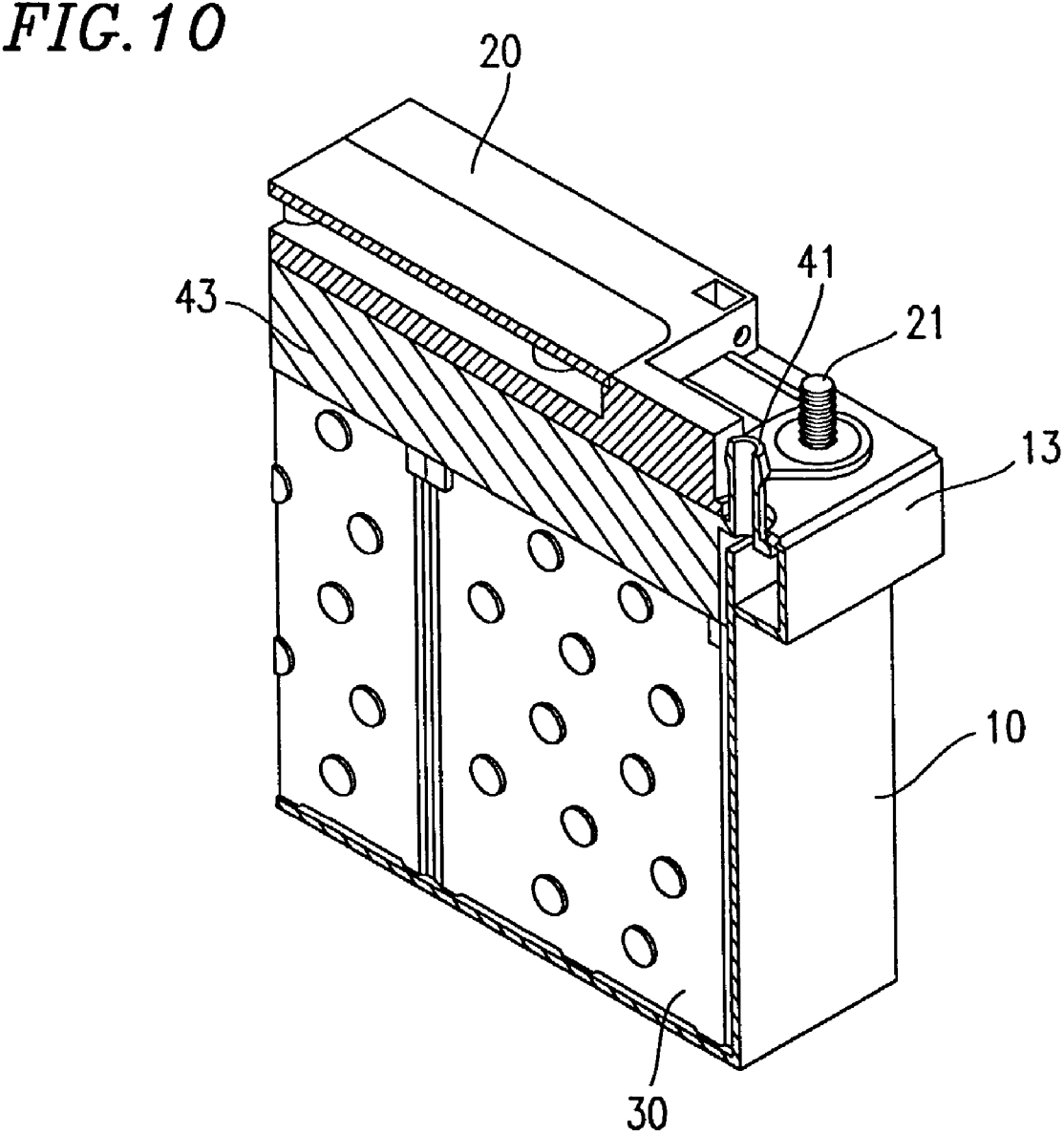
FIG. 10 is a perspective view showing a longitudinal cross section of an end of the battery of Example 1, including the inlet orifice 41.
Figure 11:
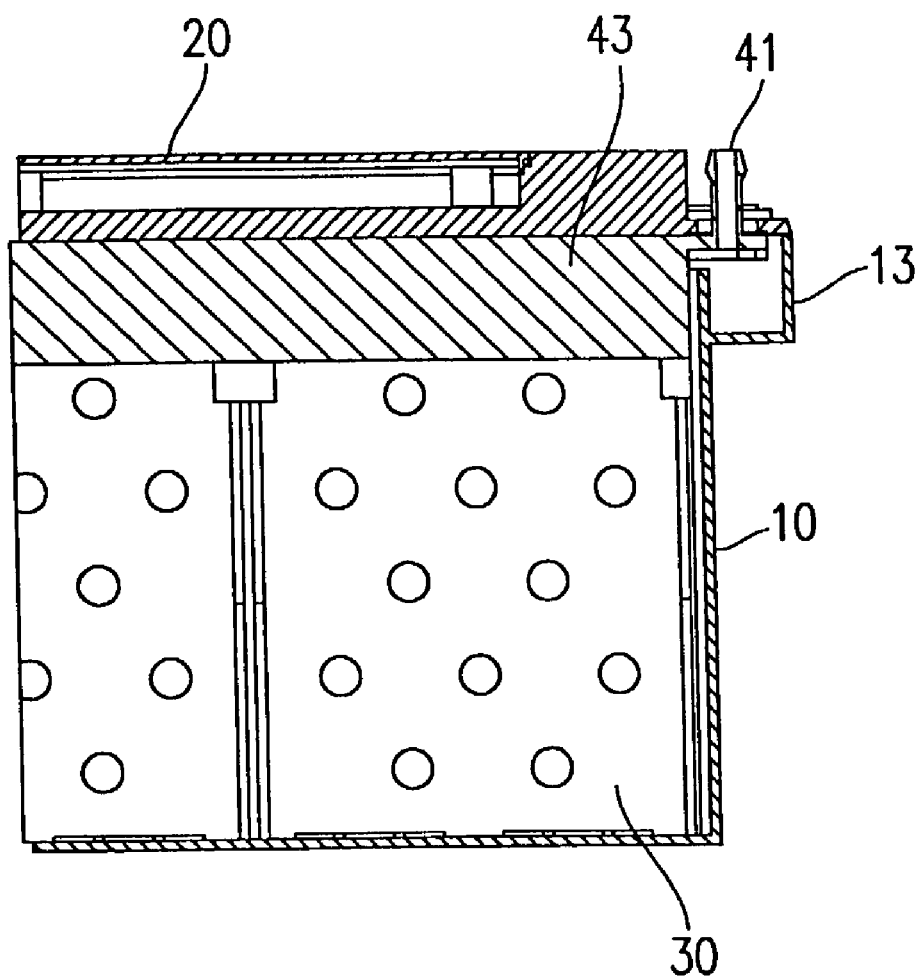
FIG. 11 is a longitudinal cross section showing the end of the battery of Example 1, including the inlet orifice.
Figure 12:
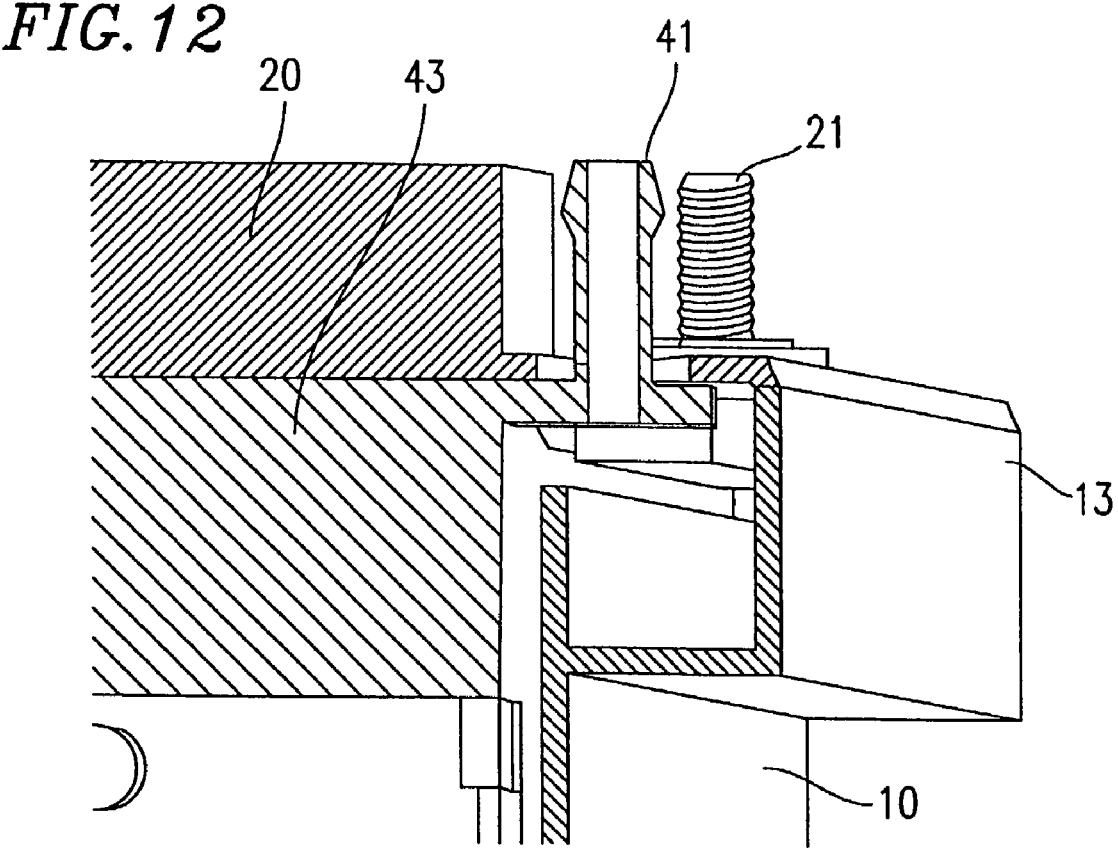
FIG. 12 is a perspective view showing an enlarged cross section of the inlet orifice and its surroundings of the battery of Example 1.
Figure 13:
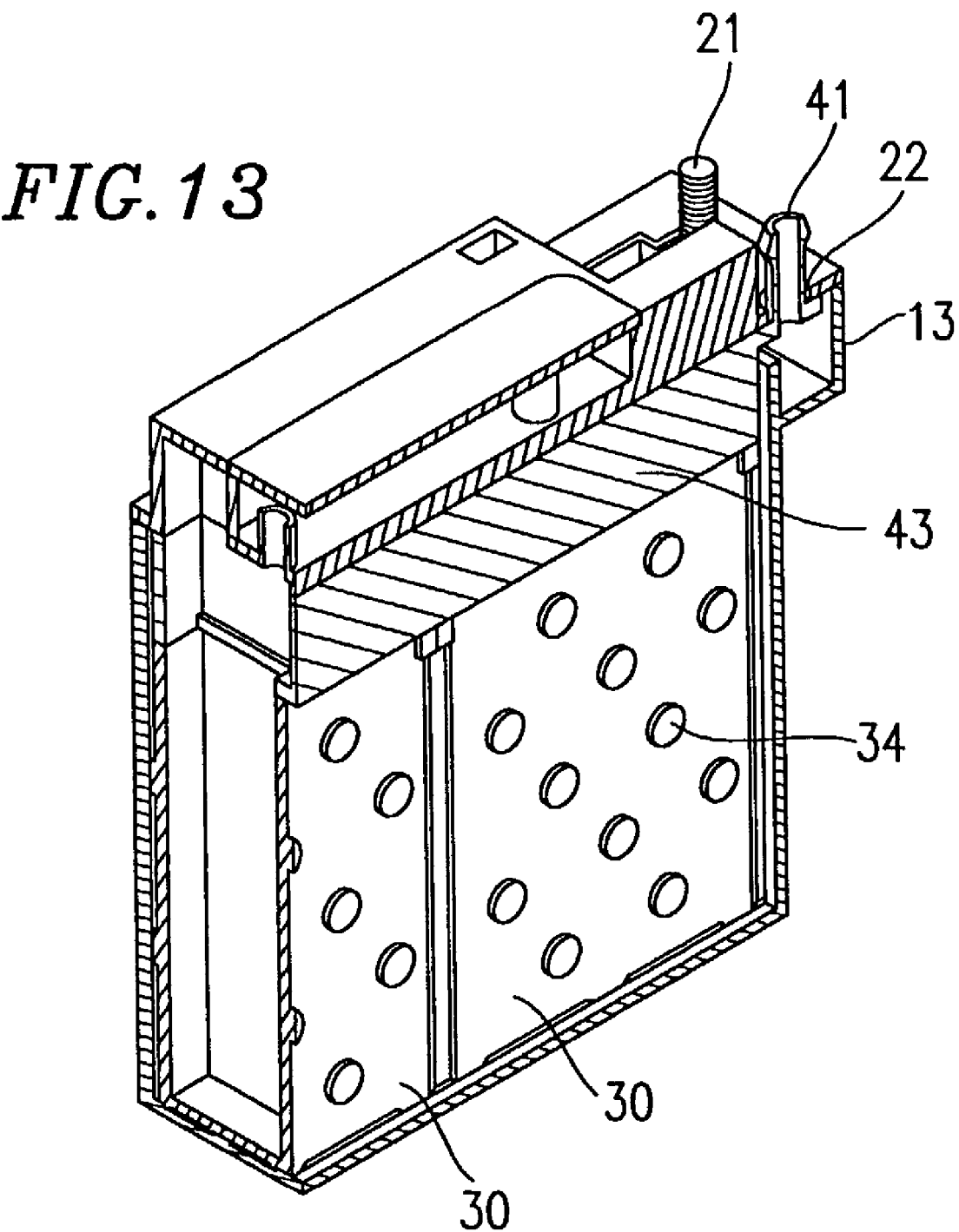
FIG. 13 is a perspective view showing a longitudinal cross section and a transverse cross section of the end of the battery of Example 1, including the inlet orifice.

FIG. 8 is a perspective view showing a longitudinal cross section of the cooling box 10 in which the battery case 40 containing the 6 cells 30 bound integrally is inserted and to which the lid 20 is attached. FIG. 9 shows the longitudinal cross section. FIG. 10 is a perspective view showing a longitudinal cross section of an end of the battery, including the inlet orifice 41. FIG. 11 shows the longitudinal cross section. FIG. 12 is a perspective view showing an enlarged cross section of the inlet orifice 41 and its surroundings. FIG. 13 is a perspective view showing a longitudinal cross section and a transverse cross section of the end including the inlet orifice 41.

A hollow injection header 13 is provided across a top outer portion of an end in the longitudinal direction of the cooling box 10 in the thickness direction. The injection header 13 has an open top. When the battery case 40 is inserted into the cooling box 10, the inlet orifice 41 of the battery case 40 is located at the middle of the injection header 13. The injection header 13 is supplied with a coolant through the inlet orifice 41. The injection header 13 is in communication with space between the cell 30 contained in the cooling box 10 and the inner wall surface 11 of the cooling box 10.

A hollow drain header 14 is provided across a top outer portion of the other end in the longitudinal direction of the cooling box 10 in the thickness direction. The drain header 14 has an open top. When the battery case 40 is inserted into the cooling box 10, the outlet orifice 42 of the battery case 40 is located at the middle of the drain header 14. The drain header 14 is also in communication with space between the cell 30 contained in the cooling box 10 and the inner wall surface 11 of the cooling box 10. The drain header 14 is supplied with a coolant, which has been used to cool the cells 30, from the cooling box 10, and the coolant is drained from the outlet orifice 42.

Figure 14:
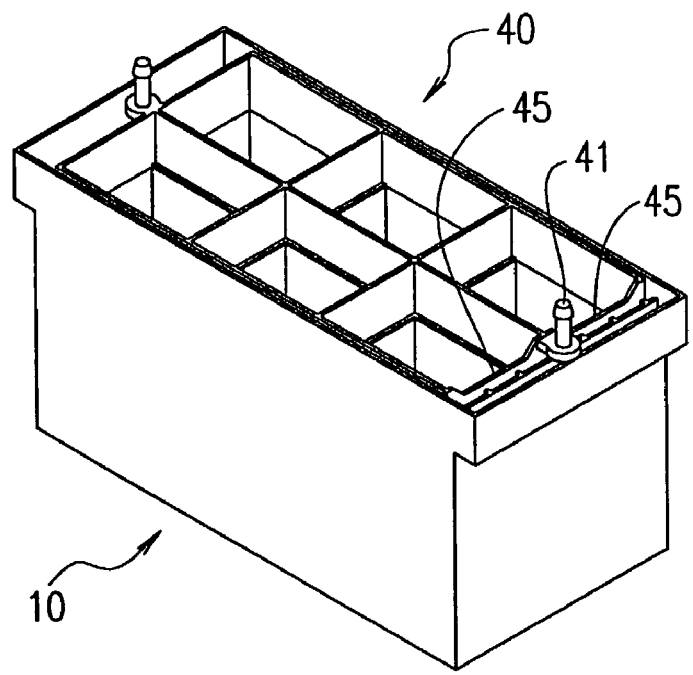
FIG. 14 is a perspective view showing the battery case contained in the cooling box according to Example 1.
Figure 15:
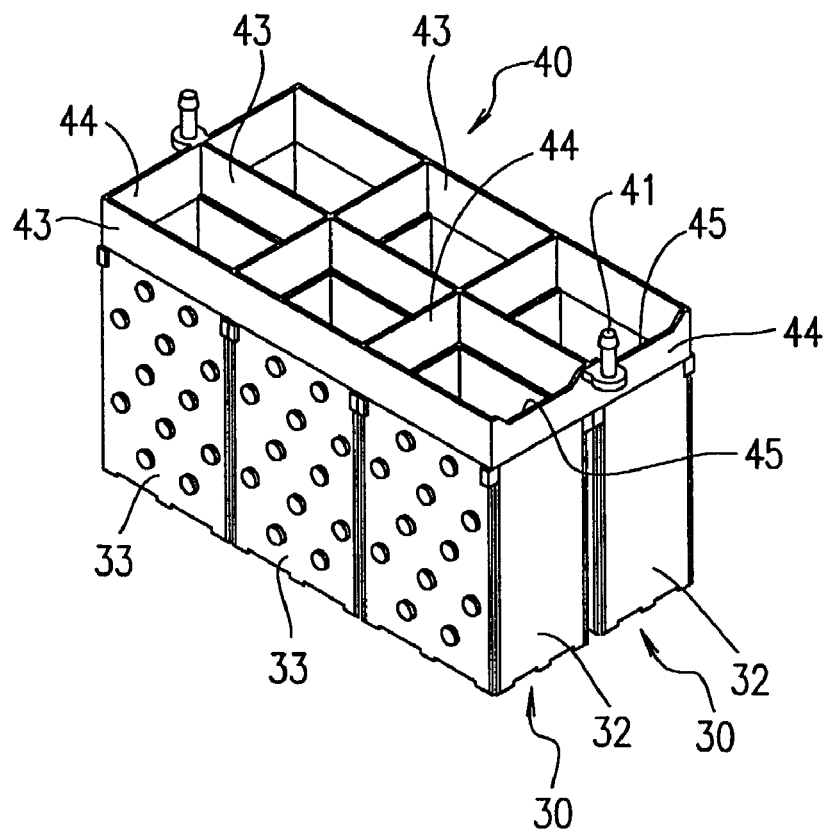
FIG. 15 is a perspective view for explaining depressions provided in the battery case according to Example 1.
Figure 16:
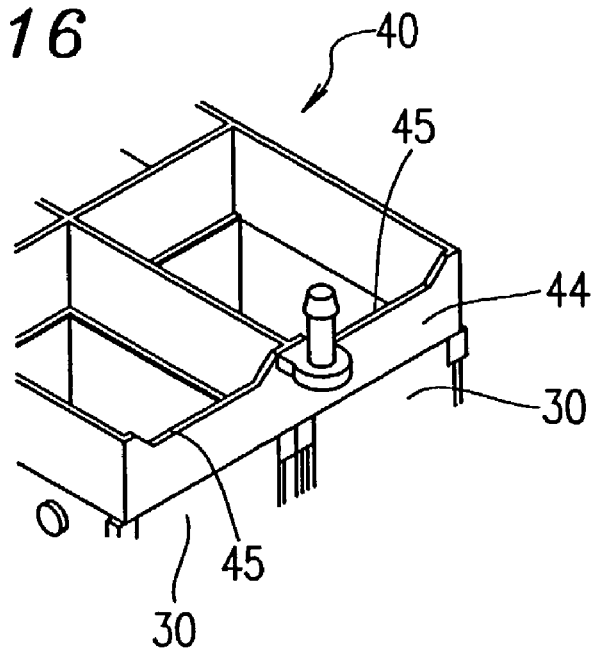
FIG. 16 is a perspective view showing an enlarged substantial portion of the battery case of the battery of Example 1.
Figure 17:
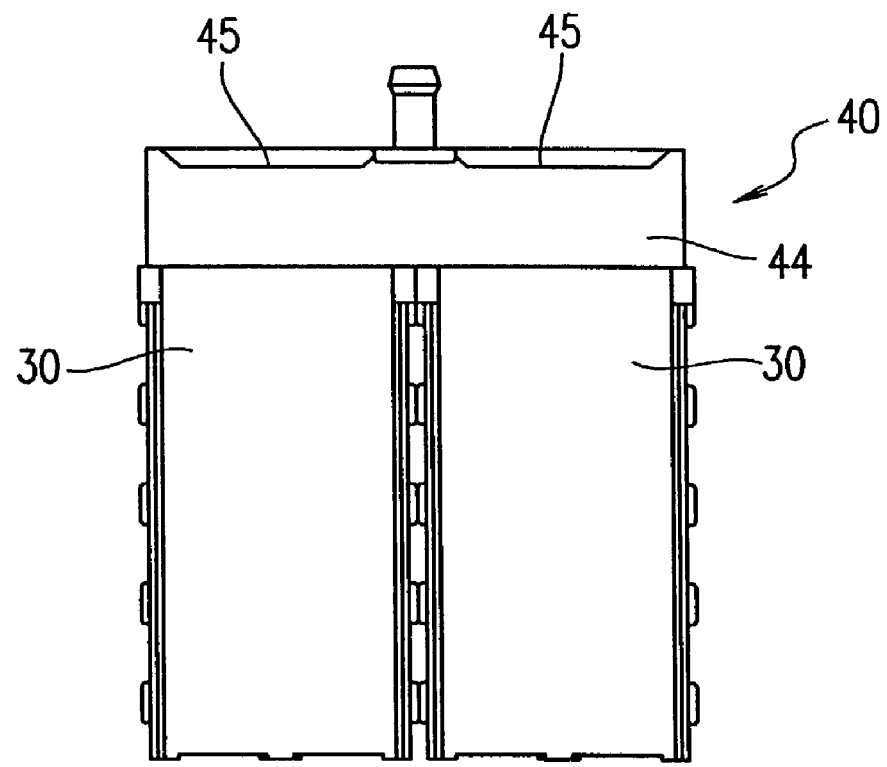
FIG. 17 is a front view for explaining the depression provided on the battery case in the battery of Example 1.

Next, a relationship between a depression 45 provided in the battery case 40 and a protrusion 24 provided in the lid 20 will be described. FIG. 14 is a perspective view showing the battery case 40 contained in the cooling box 10 according to Example 1 of the present invention. FIG. 15 is a perspective view for explaining the depression 45 provided in the battery case 40. FIG. 16 is a perspective view showing a substantial portion of the battery case 40. FIG. 17 is a front view of the battery case 40. Two trapezoidal depressions 45 are provided in the thickness direction side holding portion 44, which is the closest to the inlet orifice 41 of the four thickness direction side holding portions 44 of the battery case 40. The two depressions 45 are provided at positions of the thickness direction side holding portion 44 which faces the lid 20 and correspond to the two cells 30 provided at the inlet orifice 41 side.

Figure 18:
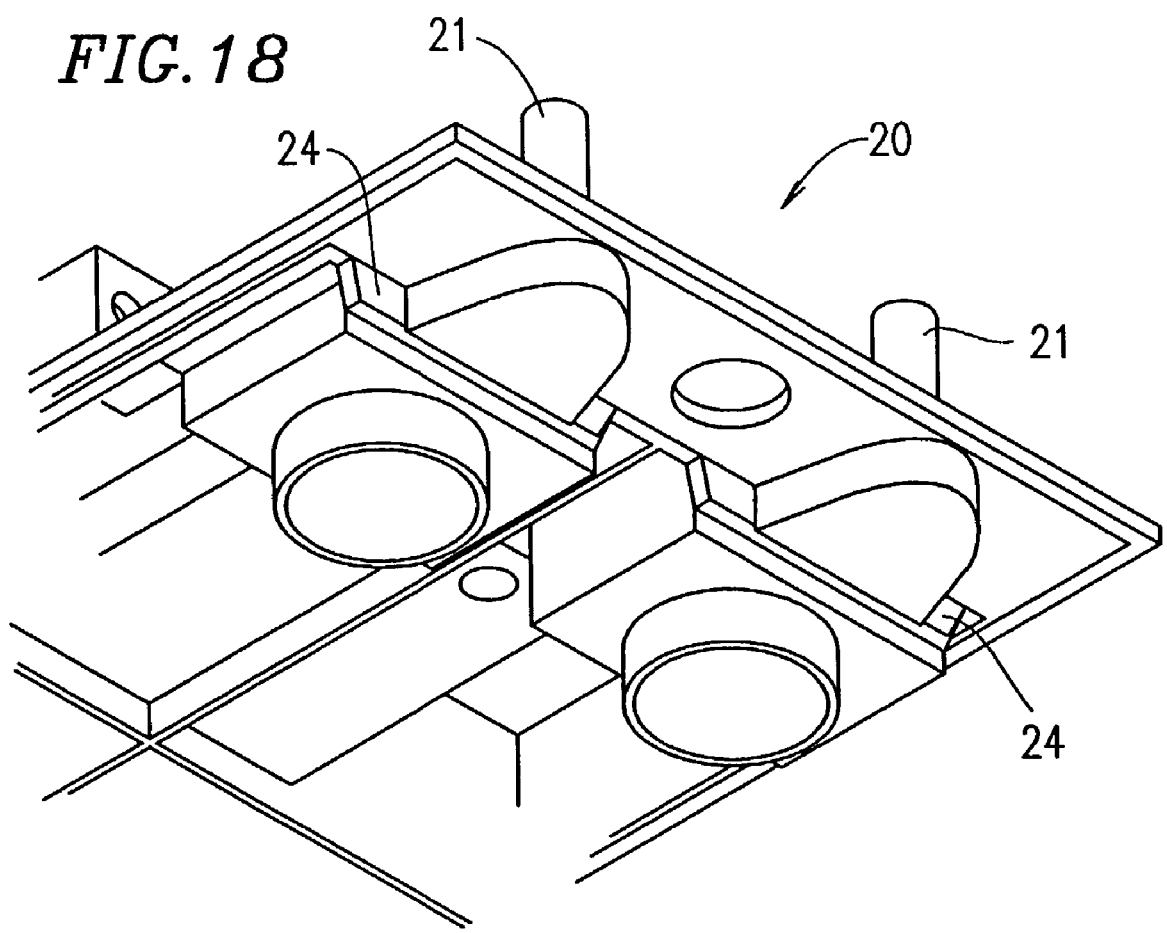
FIG. 18 is a perspective view for explaining protrusions provided on the lid in the battery of Example 1.
Figure 19:
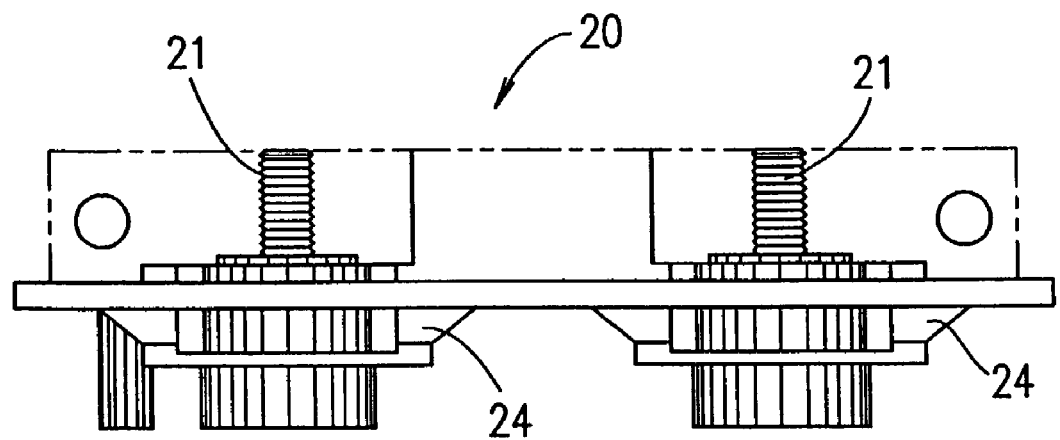
FIG. 19 is a front view showing the protrusions provided on the lid in the battery of Example 1.

FIG. 18 is a perspective view for explaining the protrusion 24 provided in the lid 20 of the battery 100 according to Example 1 of the present invention. FIG. 19 is a front view showing the protrusion 24. The lid 20 is provided with the two protrusions 24 which are engaged with the two depressions 45 provided in the thickness direction side holding portion 44 of the battery case 40. The protrusion 24 has a side in the shape of a trapezoid and the base of the trapezoid contacts the lid 20.

When the lid 20 is attached to the cooling box 10 containing the battery case 40, the two protrusions 24 provided in the lid 20 are engaged with the two depressions 45 provided in the thickness direction side holding portion 44, respectively. The inlet orifice 41 and the outlet orifice 42 provided in the battery case 40 are passed through the respective orifice holding holes 22 and 23 provided in the lid 20.

As described above, according to Example 1, the two protrusions 24 provided in the lid 20 are engaged with the two depressions 45 provided in the thickness direction side holding portion 44 of the battery case 40, respectively, so that the cooling box 10 containing the battery case 40 can be positioned with respect to the lid 20. Therefore, the cooling box 10 containing the battery case 40 can be reliably sealed by the lid 20.

In addition, after the protrusions 24 of the lid 20 are engaged with the respective depression 45 of the battery case 40 so that the lid 20 seals the battery case 40, the battery case 40 and the lid 20 may be integrally attached to each other by welding or adhesion. The welding or adhesion can ensure the sealing of the cells 30 into the cooling box 10.

The sealing of the cooling box 10 and the lid 20 can be achieved by a simple structure such that the protrusions 24 provided in the lid 20 are engaged with the respective depressions 45 provided in the battery case 40. Thus, since there is substantially no excess structure, the cooling efficiency of the cells 30 contained in the cooling box 10 can be improved.

Further, with the above-described configuration, the lid 20 is correctly positioned with respect to the cooling box 10 so that the lid 20 can reliably seal the cooling box 10. Therefore, even in applications in which the battery experiences strong vibration in an automobile or the like, the lid 20 is unlikely to be removed from the cooling box 10, so that it is possible to prevent the coolant from entering from the coolant channel to the power generation element.

Figure 20:
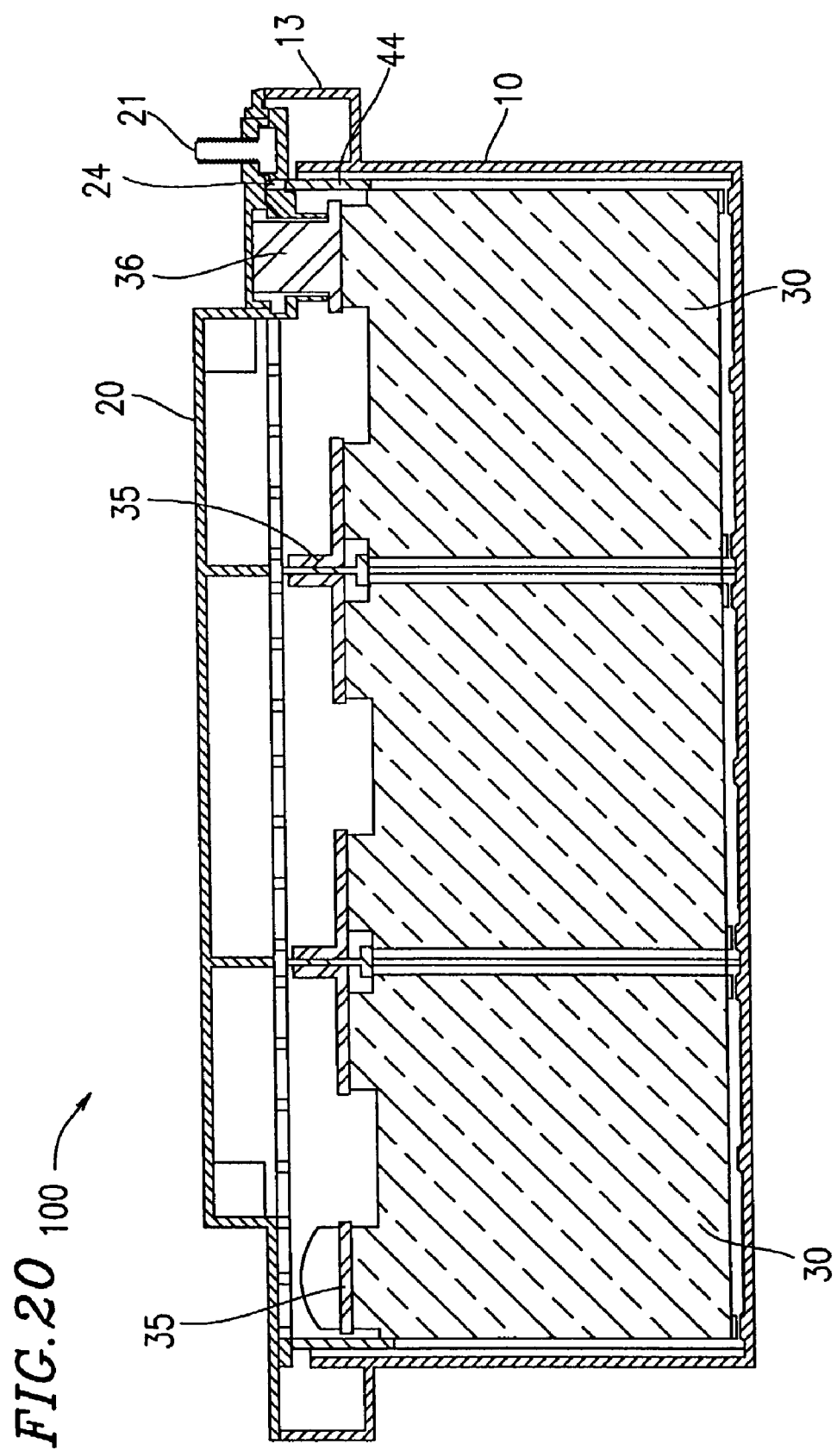
FIG. 20 is a cross-sectional view showing the battery of Example 1 taken through one of battery terminals of the cooling box.
Figure 21:
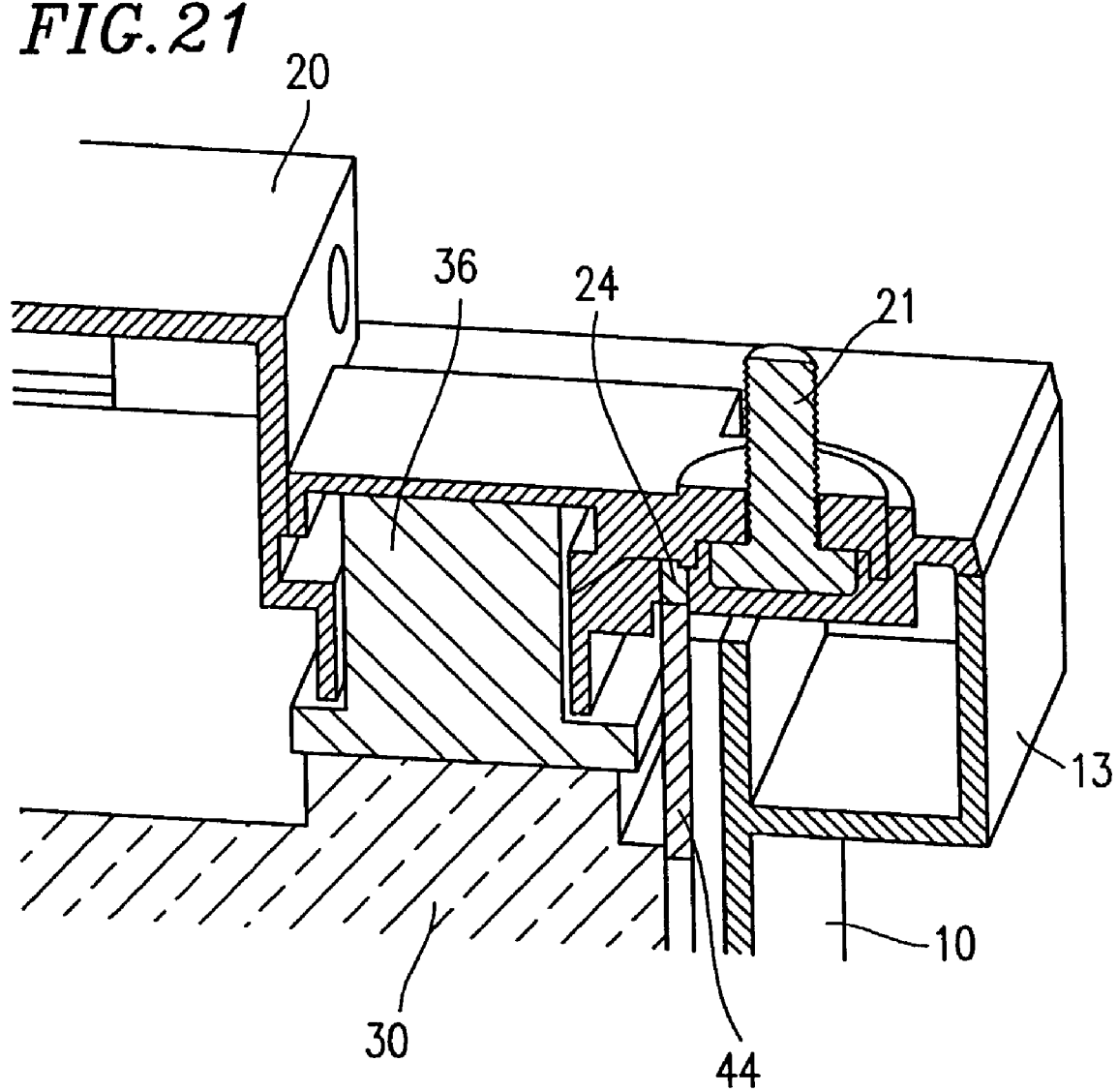
FIG. 21 is a perspective view showing a longitudinal cross section of an end of the battery of Example 1, at which a battery terminal is provided.
Figure 22:
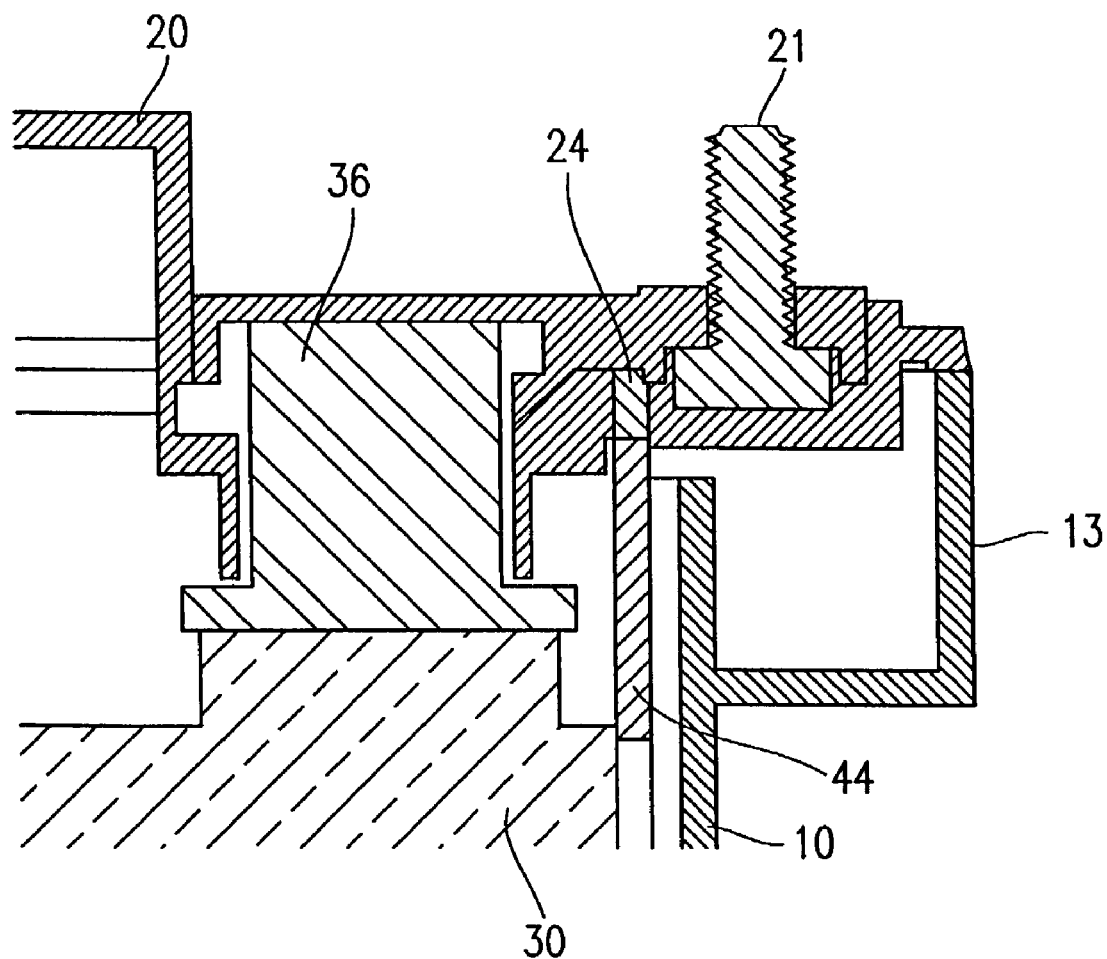
FIG. 22 is a longitudinal cross section showing the end of the battery of Example 1, at which a battery terminal is provided.

FIG. 20 is a perspective view showing a longitudinal cross section of the battery 100 taken through one of the battery terminals 21, in which the battery case 40 contains the 6 cells 30 and the lid 20 is attached to the cooling box 10. FIG. 21 is a perspective view showing a longitudinal cross section of an end of the battery 100, at which one of the two battery terminals 21 is provided. FIG. 22 shows the longitudinal cross section.

When the lid 20 is attached to the cooling box 10, the two battery terminals 21 are located over the injection header 13. Each battery terminal 21 is in the shape of a bolt, and is integrated with the lid 20 by insert molding. In this situation, the two battery terminals 21 are electrically connected to the respective terminals 36 of a pair of cells 30 disposed at an end of the 3×2 matrix of the cells 30, the pair of cells 30 constituting a row of the matrix, via a connecting member provided in the lid 20. In this manner, the two battery terminals 21 allow the 3×2 matrix cells 30 connected in series to connect to the outside.

Figure 23:
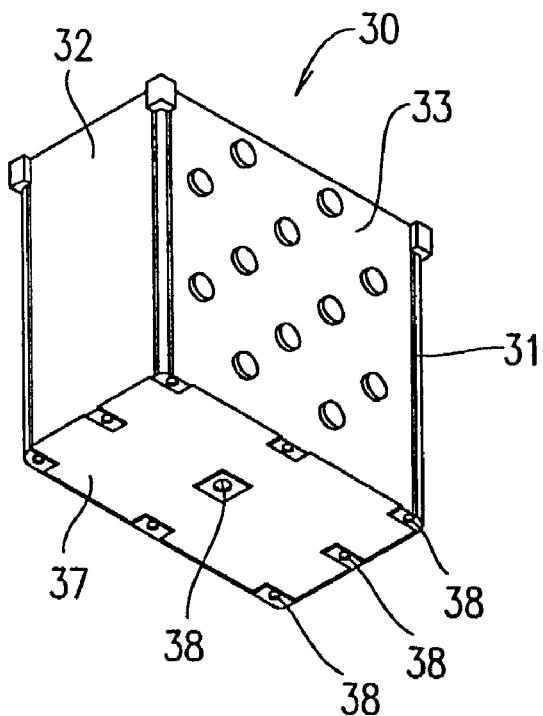
FIG. 23 is a perspective view showing a cell of the battery of Example 1, when viewed from the bottom.
Figure 24:
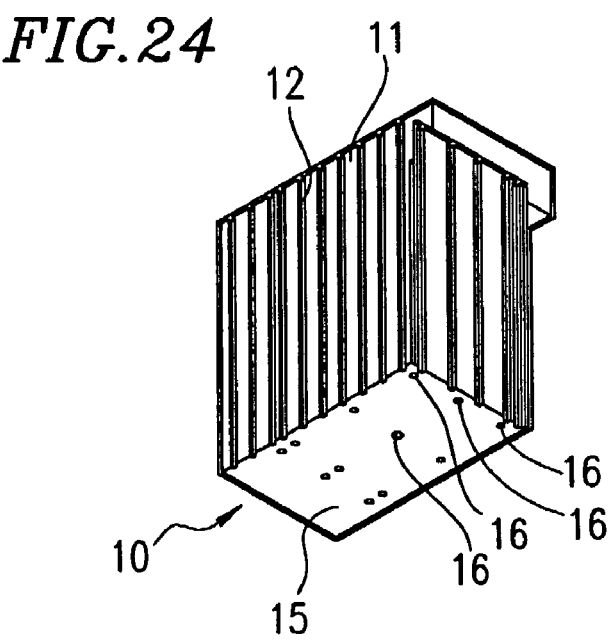
FIG. 24 is a perspective view showing an inner bottom side and an inner wall surface of the cooling box in the battery of Example 1.

FIG. 23 is a perspective view showing the bath 31 of the cell 30 according to Example 1, when viewed from the bottom. FIG. 24 is a perspective view of the cooling box 10 of FIG. 6 cut out vertically along AOA' of FIG. 6, when viewed from the top, showing the inner bottom side and the inner wall surface of the cooling box 10. Referring to FIG. 23, a plurality of depressions 38 are provided on the bottom side 37 of the bath 31. The depression 38 is in the shape of a circle. One depression 38 is provided at each of the four corners of the bottom side 37, and at the middle of each of the two longer sides and the two shorter sides, and further at the center of the bottom side 37. That is, a total of nine depressions 38 are disposed in a matrix of 3 rows×3 columns. The depression 38 disposed at the center of the bottom side 37 has a larger diameter than that of the other depressions 38. Referring to FIG. 24, 9 protrusions 16 are provided on the inner bottom side 15 of the cooling box 10, which correspond to the 9 depressions 38 provided on the bottom side 37 of the bath 31. The 9 protrusions 16 are fitted and engaged with the respective depressions 38. With the depressions 38 and the protrusions 16, the bath 31 and the cooling box 10 are positioned with respect to each other, so that the cell 30 contained in the cooling box 10 is sealed.

Figure 25:
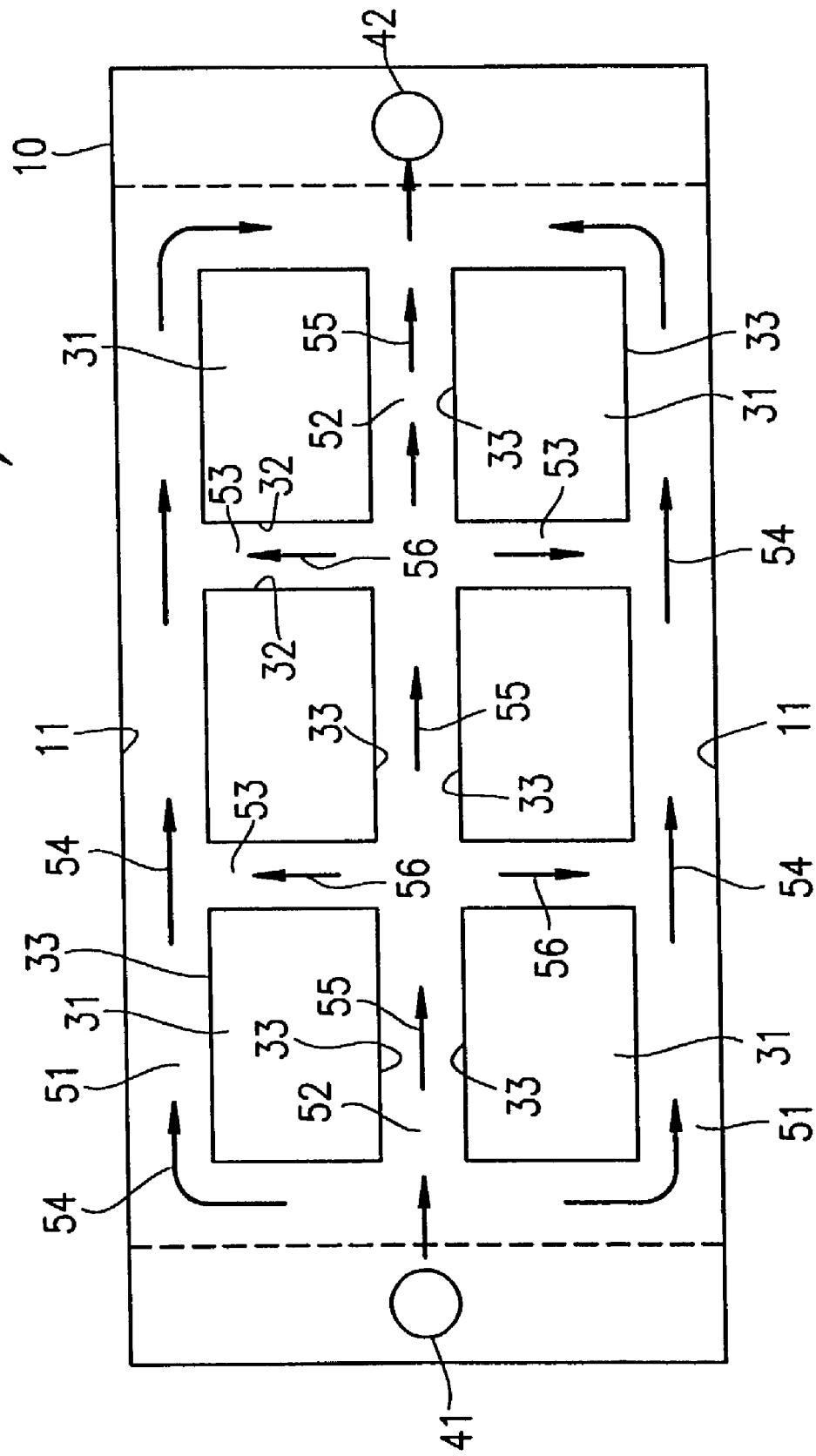
FIG. 25 is a top view schematically showing coolant channels for the battery of Example 1.

FIG. 25 is a top view of the battery 100 of Example 1, schematically showing the coolant channel. As described above, the cooling box 10 contains the 6 baths 31 of the cells 30 disposed in the 3×2 matrix.

As shown in FIG. 25, a coolant channel 51 is provided on the opposite sides of the cooling box 10 by spacing between the inner wall surface 11 of the cooling box 10 and the width direction sides 33 of the cells 30 facing thereto. The coolant channel 51 is surrounded by the width direction sides 33, the inner wall surface 11, the protrusions 34 (FIG. 4) provided on the width direction sides 33, and the ribs 12 (FIG. 6) provided on the inner wall surface 11. A coolant channel 52 is provided between the width direction sides 33 facing inwardly of the baths 31. The coolant channel 52 is surrounded by the width direction sides 33 and the protrusions 34 (FIG. 4) provided on the width direction sides 33. Four coolant channels 53 are provided between the thickness direction sides 32 facing each other. The coolant channel 53 is in communication with the coolant channels 51 and 52. The coolant channels 51 and 52 are in communication with the injection header 13 (FIG. 8) and the drain header 14 (FIG. 8).

In the battery 100 having the coolant channels 51, 52 and 53, a part of the coolant injected from the inlet orifice 41 is allowed to flow through the injection header 13 and then through the central coolant channel 52 in a direction indicated by arrow 55, forcibly cooling the width direction sides 33 forming the coolant channel 52. The remaining part of the coolant injected from the injection header 13 (FIG. 8) is allowed to flow through the coolant channels 51 on the opposite sides of the cooling box 10 in a direction indicated by arrow 54, forcibly cooling the width direction sides 33 forming the coolant channel 51. A part of the coolant flowing through the central coolant channel 52 is branched into the four coolant channels 53 in a direction indicated by arrow 56. The coolant flowing through the coolant channel 53 is merged with the coolant flowing through the coolant channel 51. The coolant flowing through coolant channels 51 and 52 are drained through the drain header 14 (FIG. 8) from the outlet orifice 42.

The coolant flowing through the coolant channels 51 and 52 forms a main stream, while the coolant flowing through the coolant channel 53 branched from the coolant channel 52 forms a branched stream. Thus, the coolant channels 51 and 52 are provided so that the main coolant stream runs in a direction a long the width direction side 33 and perpendicular to the thickness direction side 32.

Referring back to FIG. 22, the battery terminals 21 are provided over the respective injection headers 13. The battery terminal 21 is cooled by heat exchange with the coolant passing through the injection header 13 below. Thus, the coolant is injected through the injection header 13 provided below the battery terminal 21, is then allowed to flow through the coolant channels, and is finally drained from the drain header 14. Therefore, even if a large amount of current flows through the battery terminal 21 when the battery 100 is discharged, the battery terminal 21 can be effectively cooled, thereby making it possible to avoid damages, e.g., to prevent the surroundings of the battery terminal 21 from being melted by excessive heat generation of the battery terminal 21.

According to Example 1 of the present invention, the main coolant stream in the coolant channels 51 and 52 flows along the width direction sides 33 of the cells 30. Therefore, the main coolant stream runs in a direction parallel to the electrode plate contained in the bath 31. Therefore, the electrode plate is forcibly cooled by the coolant efficiently. As a result, a higher level of cooling efficiency can be obtained.

Further, according to Example 1 of the present invention, the main coolant stream runs in a direction perpendicular to the thickness direction side 32. Therefore, the bath 31 can be cooled with simple structure in which a single inlet orifice 41 and a single outlet orifice 42 are provided. Therefore, the battery of the present invention has a simpler structure for cooling the cells 30 than the above-described conventional structure which requires an arrangement for distributing a coolant to a plurality of coolant channels, leading to a reduction in the number of assembly steps and cost.

Figure 26:
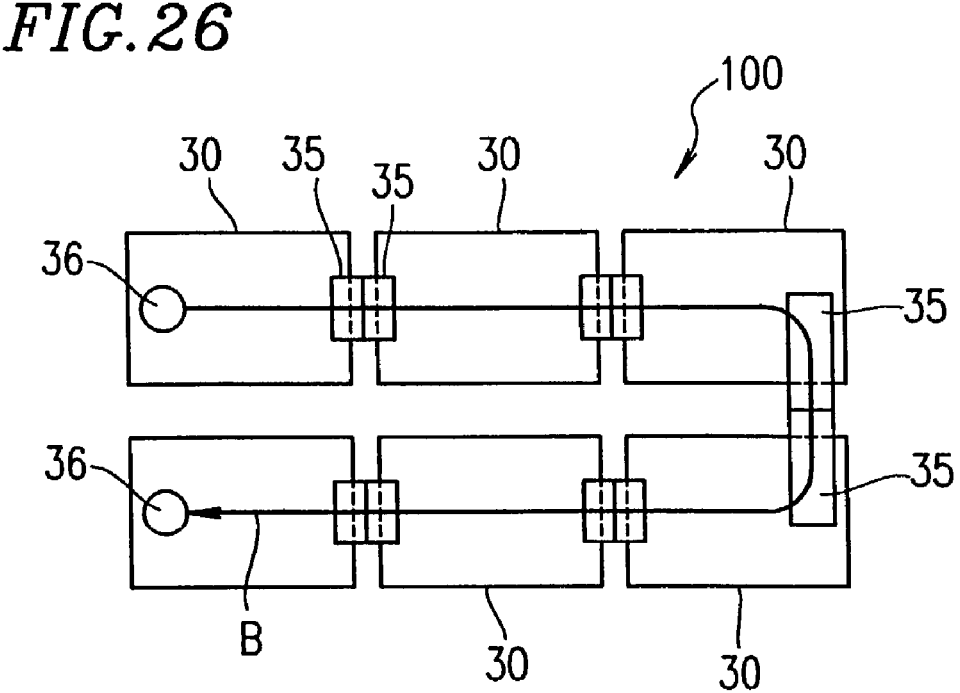
FIG. 26 is diagram for explaining a current path in the battery of Example 1.
Figure 27:
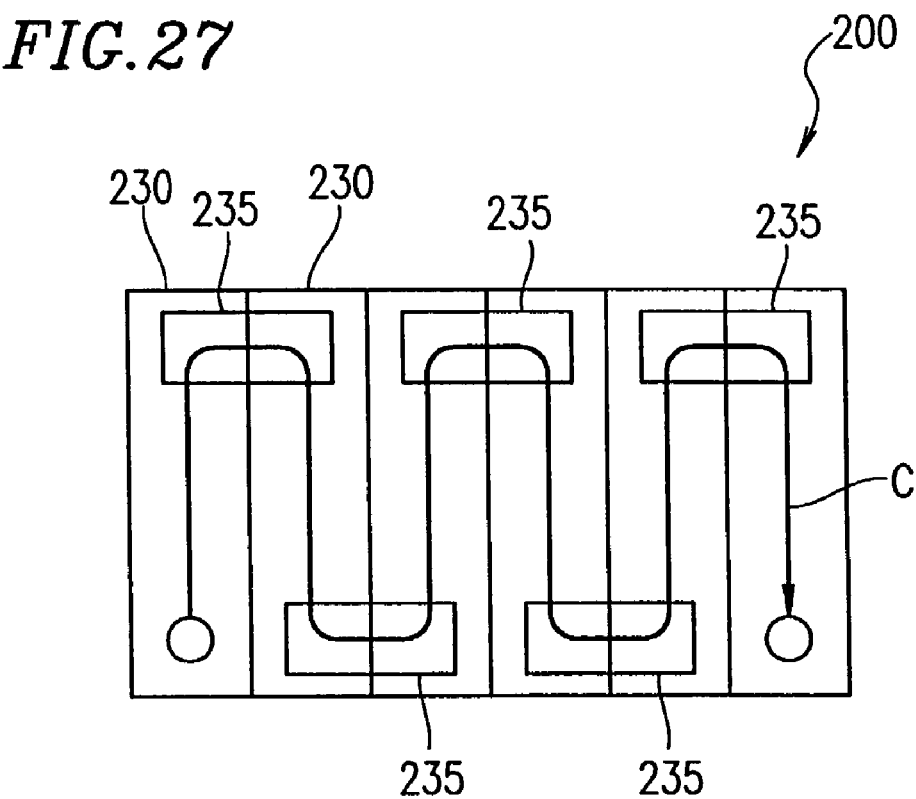
FIG. 27 is a diagram for explaining a current path in a battery as a comparative example.

FIG. 26 is diagram for explaining a current path in the battery 100 of Example 1 of the present invention. FIG. 27 is a diagram for explaining a current path in a battery 200 as a comparative example. Referring to FIG. 26, as described in FIGS. 4 and 5, the 6 cells 30 are arranged in a matrix of 3 rows×2 columns. The two central cells 30 are electrically connected via the straps 35 to the respective cells 30 adjacent thereto on the opposite sides of the battery 100. The two columns of the cells 30 are electrically connected to each other via the straps 35 provided to the two cells 30 on one end of the battery 100. Thus, the 6 cells 30 are linked to each other in series in substantially a U shape. Therefore, the current path in the battery 100 of Example 1 is in the substantial U shape indicated by arrow B.

Referring to FIG. 27, in the battery 200 of the comparative example, the 6 cells 230 are disposed side by side where the width direction sides thereof face each other, and the straps 235 are disposed alternately near one thickness direction side and then the other thickness direction side, linking the 6 cells 230 disposed in a matrix of 1 rows×6 columns in series. Therefore, the current path in the battery 200 of the comparative example meanders over a long distance in a direction along the width direction side indicated by arrow C.

Thus, the cells 30 in the battery 100 of Example 1 are arranged in the 3×2 matrix, linked to each other in series in the U shape. Therefore, the current path is shorter than that in the comparative example. For this reason, loss due to the connecting portions between the cells 30 can be reduced, thereby reducing heat generation. As a result, high power can be obtained.

Figure 28:
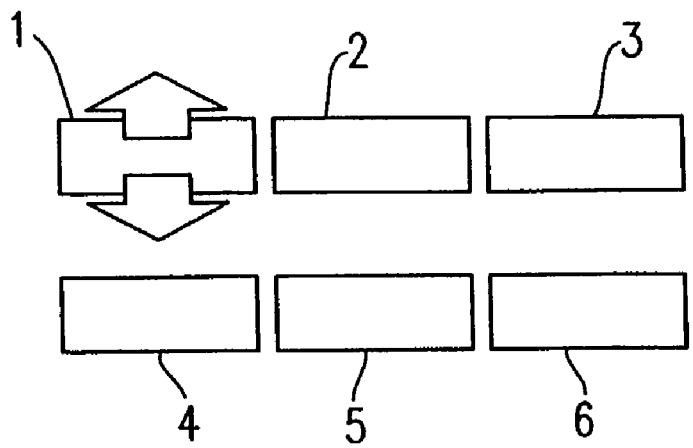
FIG. 28 is a diagram for explaining expansion of the cells in the battery of Example 1.
Figure 40:
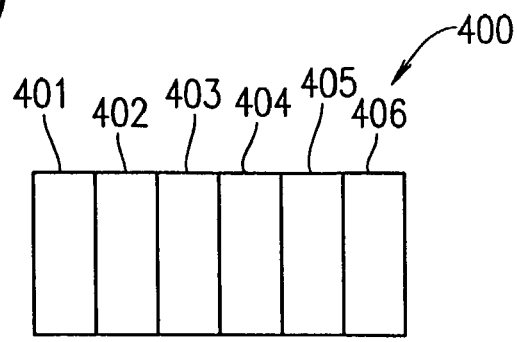
FIG. 40 is a diagram showing a configuration of a conventional battery.

FIG. 28 is a diagram for explaining expansion of the cells 30 in the battery 100 of Example 1. Referring to FIG. 28, the cells 30, which expand in a direction perpendicular to the width direction side, are arranged in a matrix of 3 rows×2 columns where the 3 cells in each column have their thickness direction sides facing each other and the two cells in each row have the width direction side facing each other. Thus, in the battery 100 of Example 1, only two cells 30 are disposed in a direction perpendicular to the width direction side, i.e., a direction in which the cell 30 expands. Therefore, as compared to the conventional arrangement shown in FIG. 40 in which all 6 cells are lined up in a direction perpendicular to the width direction side, the influence of the expansion of the cell in Example 1 on other cells is small, whereby the total amount of expansion of the cells can be reduced.

Figure 29:
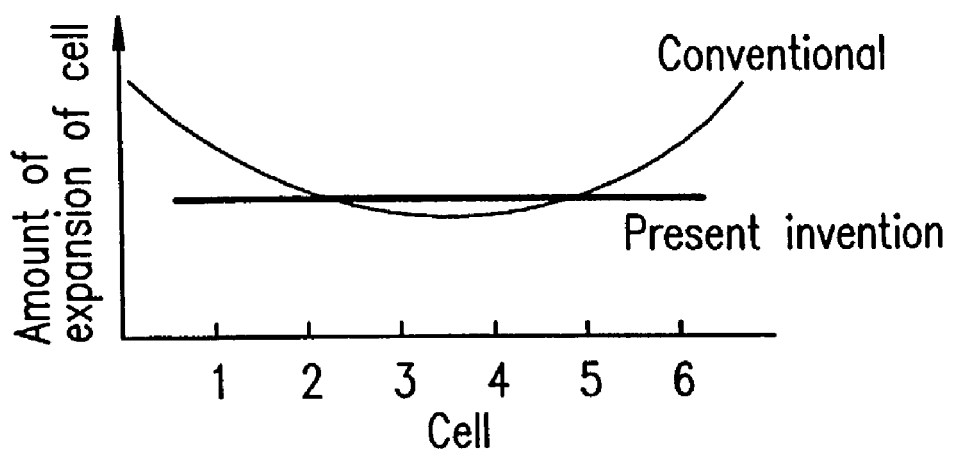
FIG. 29 is a graph for explaining expansion of the cells in the battery of Example 1.
Figure 41:
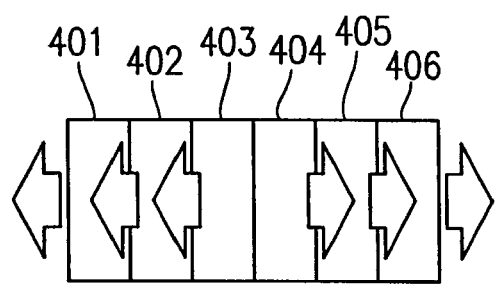
FIG. 41 is a diagram for explaining expansion of cells in a conventional battery.
Figure 42:
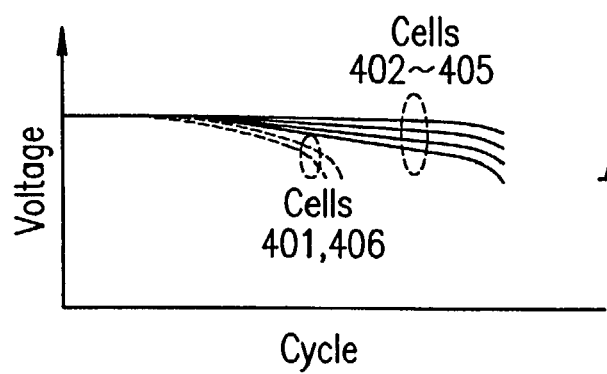
FIG. 42 is a graph showing the life characteristics of cells in a conventional battery.
Figure 43:
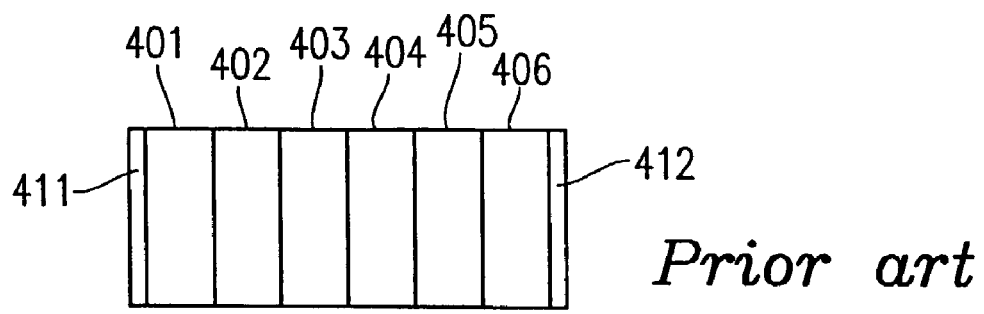
FIG. 43 is a diagram showing a configuration of another conventional battery.
Figure 44:
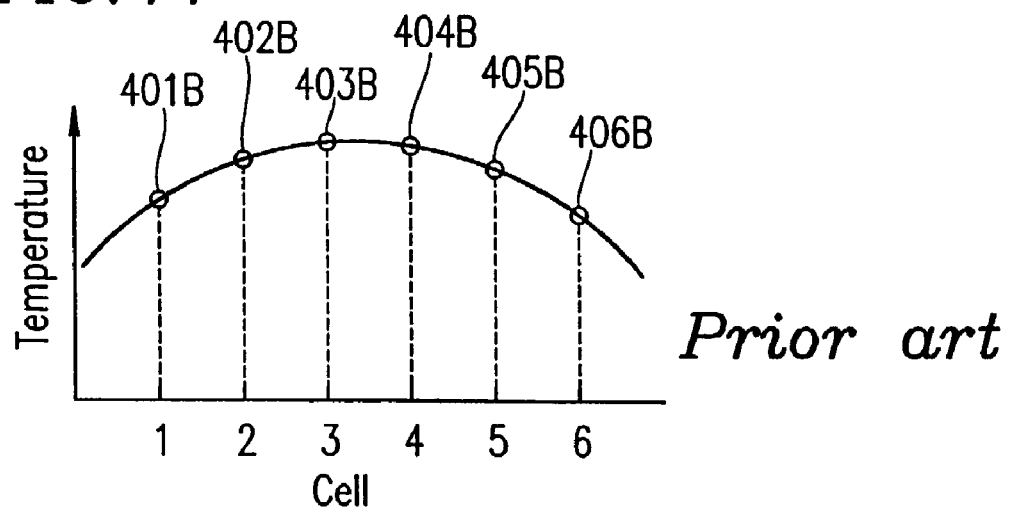
FIG. 44 is a graph showing a temperature distribution of cells in a conventional battery.
Figure 45:
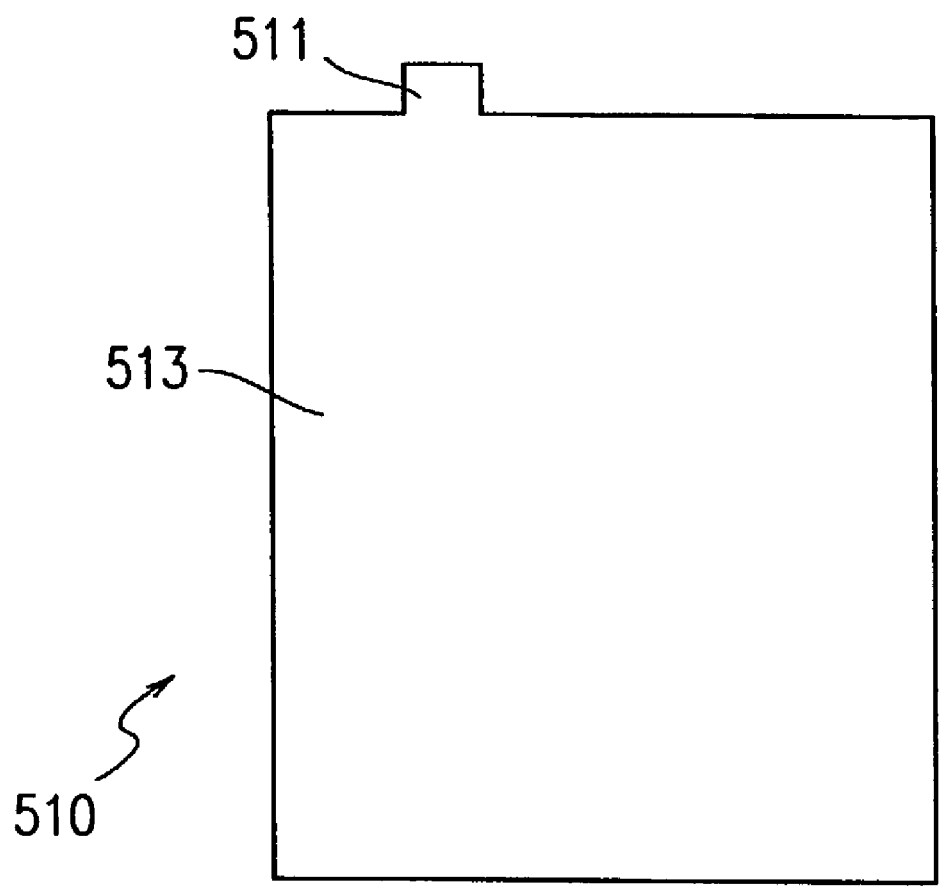
FIG. 45 is a front view showing an electrode plate used in a conventional battery.
Figure 46A:
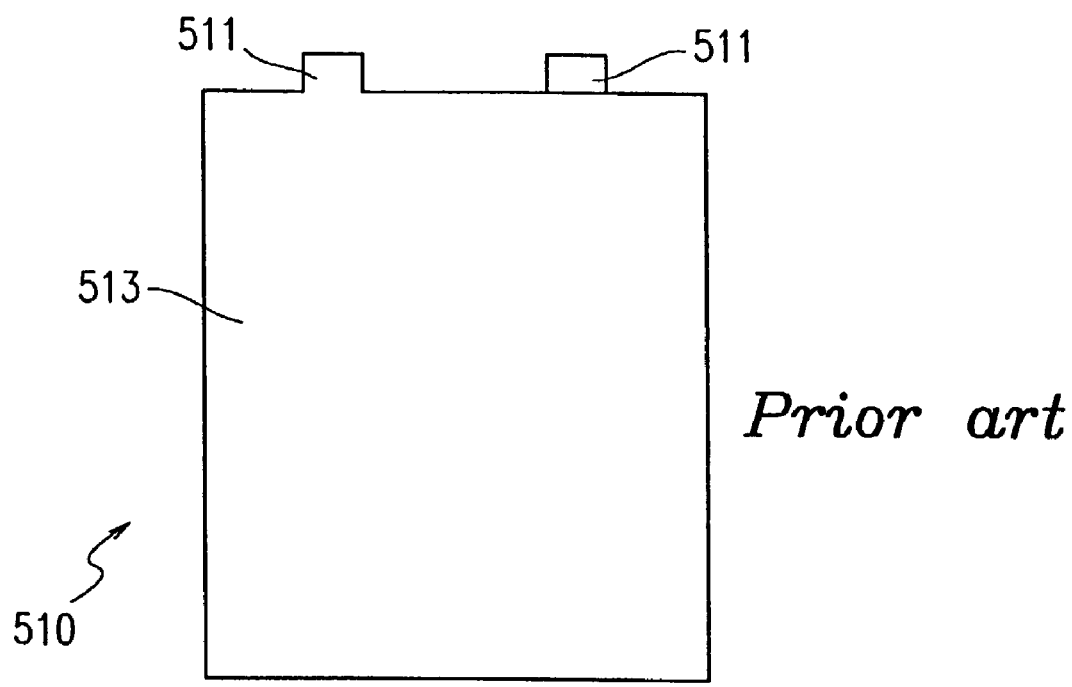
FIG. 46A is a diagram showing an electrode plate used in a conventional battery.
Figure 46B:
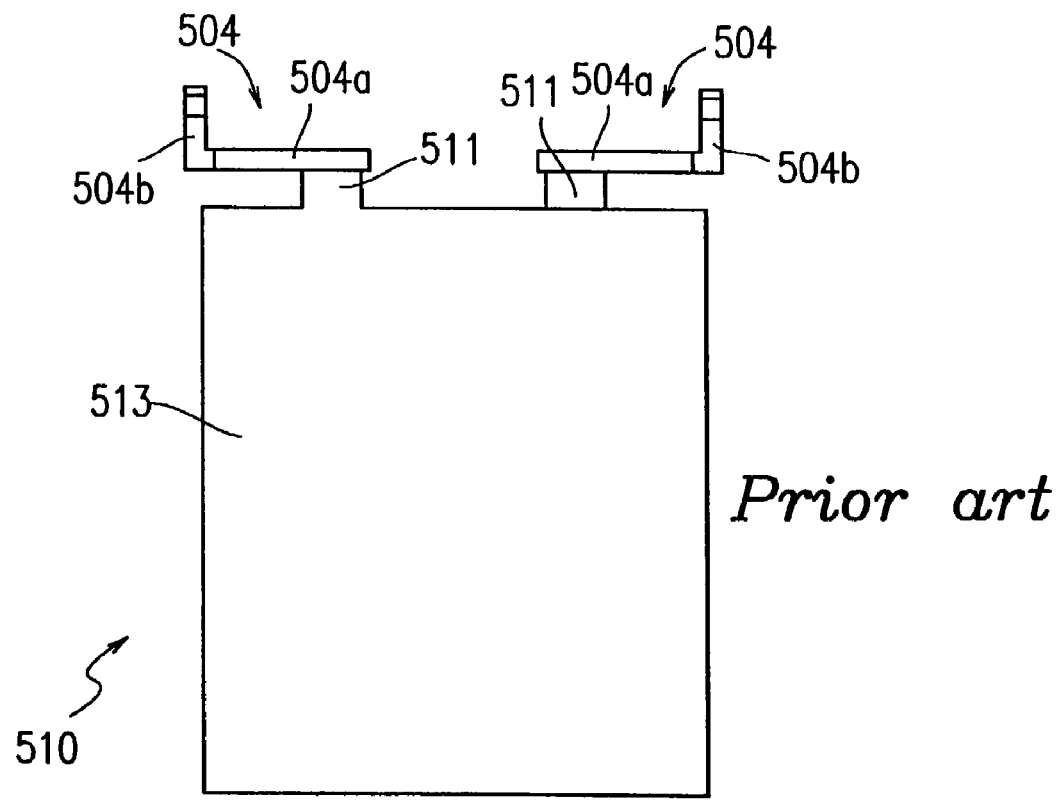
FIG. 46B is a diagram showing the electrode plate with a strap.
Figure 47:
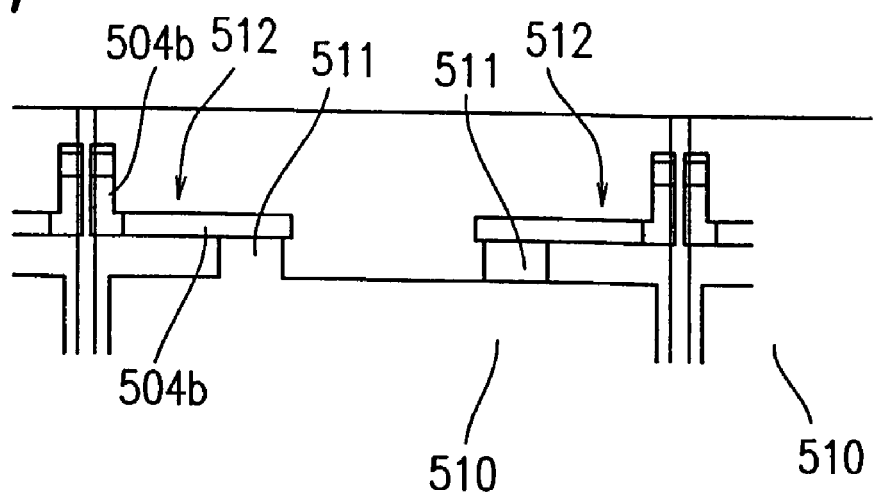
FIG. 47 is a cross-sectional view showing a unit power generation element in a cell of a conventional battery.

FIG. 29 is a graph for explaining the expansion of the cells 30 in the battery 100 of Example 1. The horizontal axis indicates the reference numerals for the cells in FIG. 28, while the vertical axis indicates the amount of expansion of each cell. As shown in FIG. 29, in the battery 100 of Example 1, since the influence of expansion of a cell on other cells is small, the amount of expansion of each cell is uniform. As opposed to this, in the conventional arrangement shown in FIGS. 40 and 41, the further out the location of the cell, the larger the amount of expansion of the cell.

Figure 30:
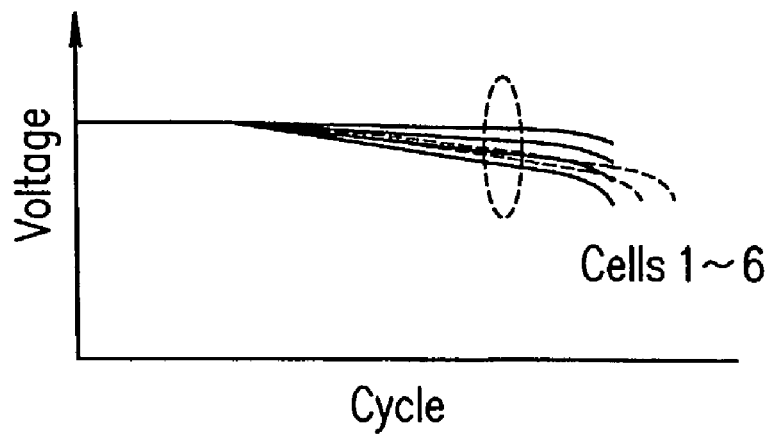
FIG. 30 is a graph for explaining the life characteristics of the cells in the battery of Example 1.

FIG. 30 is a graph for explaining the life characteristics of the cells 30 in the battery 100 of Example 1. The horizontal axis indicates the number of discharging cycles of each cell, while the vertical axis indicates the voltage of each cell. Since, as described in FIG. 29, the amount of expansion of the cells 30 is uniform, variations in the voltage between each cell are suppressed. Therefore, since the variation in voltage is small, electrolytic solution is not substantially dried up. Thus, as shown in FIG. 30, there is substantially no variation in the lives of a plurality of cells constituting a battery.

Figure 31:
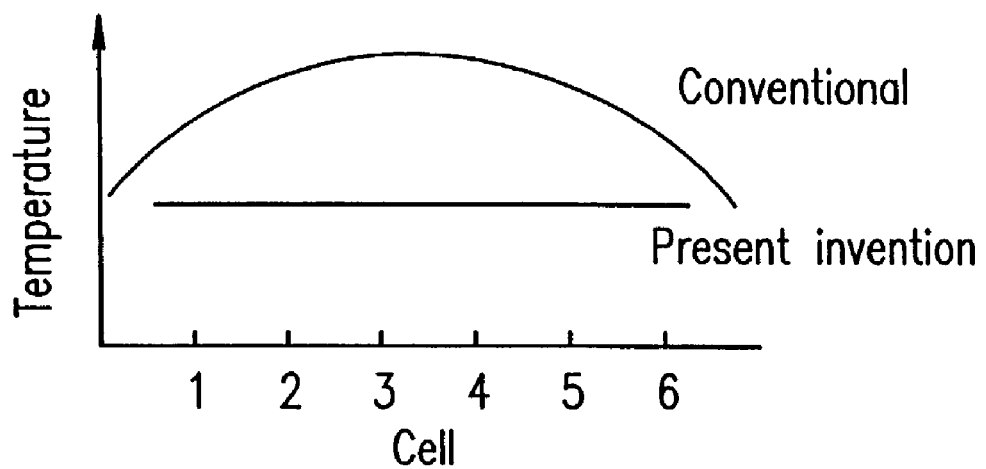
FIG. 31 is a diagram for explaining a temperature distribution of the cells in the battery of Example 1.

FIG. 31 is a diagram for explaining a temperature distribution of the cells 30 in the battery 100 of Example 1. The horizontal axis indicates the reference numerical of the cells in FIG. 28, while the vertical axis indicates the temperatures of the cells. The arrangement of Example 1 has a higher level of cooling efficiency than that of the conventional arrangement, and all of the cells have the same area contacting the coolant. Therefore, even if the battery 100 is used in an EV which has a large amount of input and output current, there is substantially no variation in temperature between each cell, unlike the conventional arrangement, as shown in FIG. 31.

The cylindrical protrusions 34 of FIG. 4 have a rectangular cross section. The cross section of the protrusions 34 may be in the shape of a cone and may have a triangular or a curved cross section. Moreover, the protrusions 34 may be in the shape of a polygonal prism, a polygonal pyramid, or the like.

Figure 32:
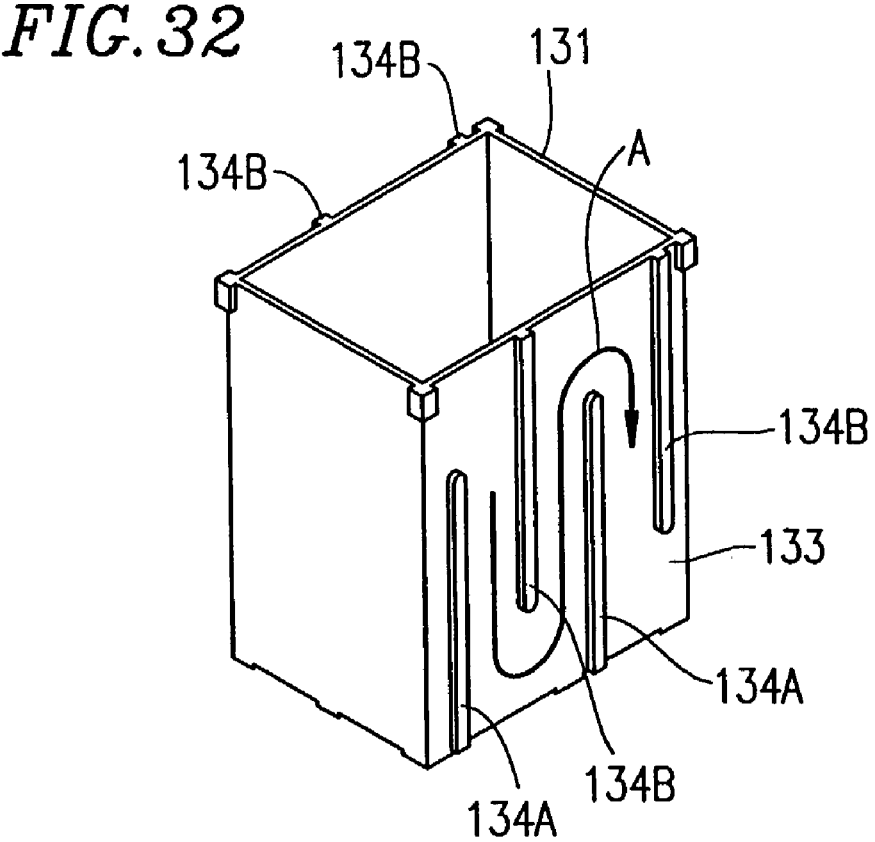
FIG. 32 is a perspective view showing another bath according to Example 1.

FIG. 32 is a perspective view showing another bath 131 according to Example 1 of the present invention. The width direction side 133 of the bath 131 is provided with a plurality of ribs 134A and 134B which form a coolant channel. The ribs 134A and 134B are in the shape of a line extending in a vertical direction, and are disposed parallel to each other at appropriate intervals. The rib 134A extends upward from the lower end of the width direction side 133, but does not reach the upper end thereof. The rib 134B extends downward from the upper end of the width direction side 133, but does not reach the lower end thereof. A coolant is allowed to flow along the ribs 134A and 134B in a direction indicated by arrow A, meandering in a vertical direction on the width direction side 133. Thus, the arrangement of the ribs 134A and 134B allows the coolant to flow over the entire width direction side 133 uniformly. As described above, when the bath 131 is applied to the battery 100 of Example 1, the coolant injected from the inlet orifice 41 meanders vertically on the width direction side 133 in the bath 131 and flows uniformly over the entire width direction side 133, thereby further improving cooling efficiency.

Figure 33:
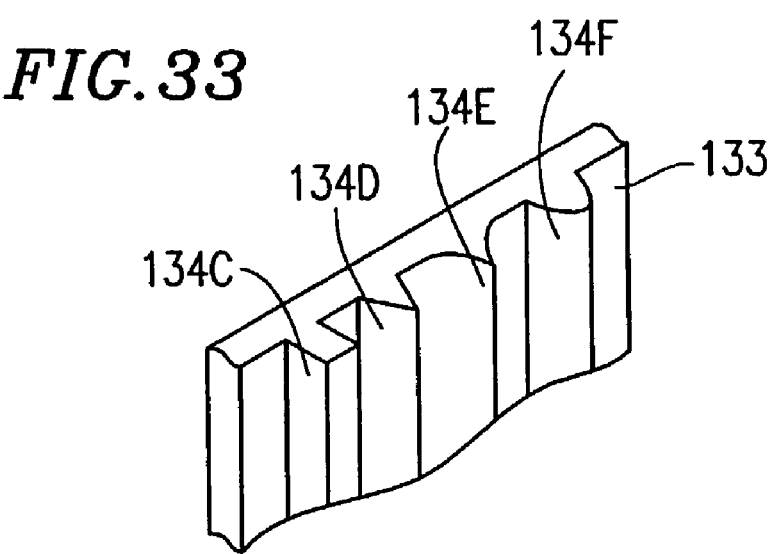
FIG. 33 is a perspective view showing cross sections of other ribs provided on a side of the bath according to Example 1.
Figure 34:
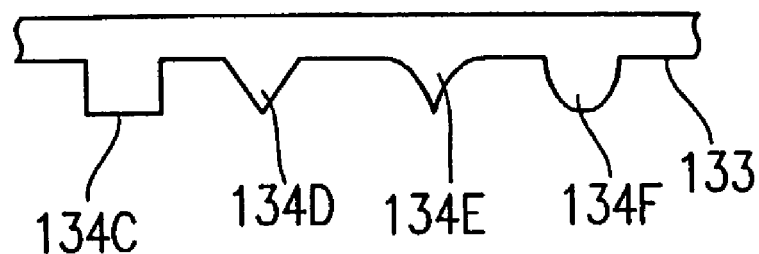
FIG. 34 is a diagram showing cross sections of other ribs provided on a side of the bath according to Example 1.

FIG. 33 is a perspective view showing cross sections of the other ribs provided on the width direction side 133 of the bath 131. FIG. 34 shows the cross section. Ribs 134C, 134D, 134E and 134F, which are in the shape of a vertical line, are provided parallel to each other on the width direction side 133. The rib 134C has a rectangular cross section taken in a direction perpendicular to the extending direction of the rib 134C. The cross section of the rib 134C maybe rectangular, or alternatively triangular as is the rib 134D, or curved as are the ribs 134E and 134F.

Figure 35:
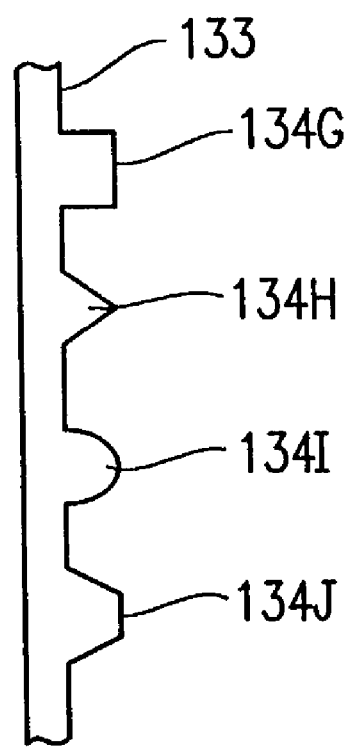
FIG. 35 is a diagram showing cross sections of still other ribs provided on a side of the bath according to Example 1.

FIG. 35 is a cross sectional view of other ribs provided on the width direction side 133 of the bath 131. The ribs 134G, 134H, 134I and 134J are provided on the width direction side 133, extending horizontally. The rib 134G has a rectangular cross section taken in a direction perpendicular to the extending direction of the rib 134G. The cross section of the rib 134G may be rectangular, or alternatively triangular as is the rib 134H, curved as is the ribs 134I, or trapezoidal as is the rib 134J.

EXAMPLE 2

Figure 36:
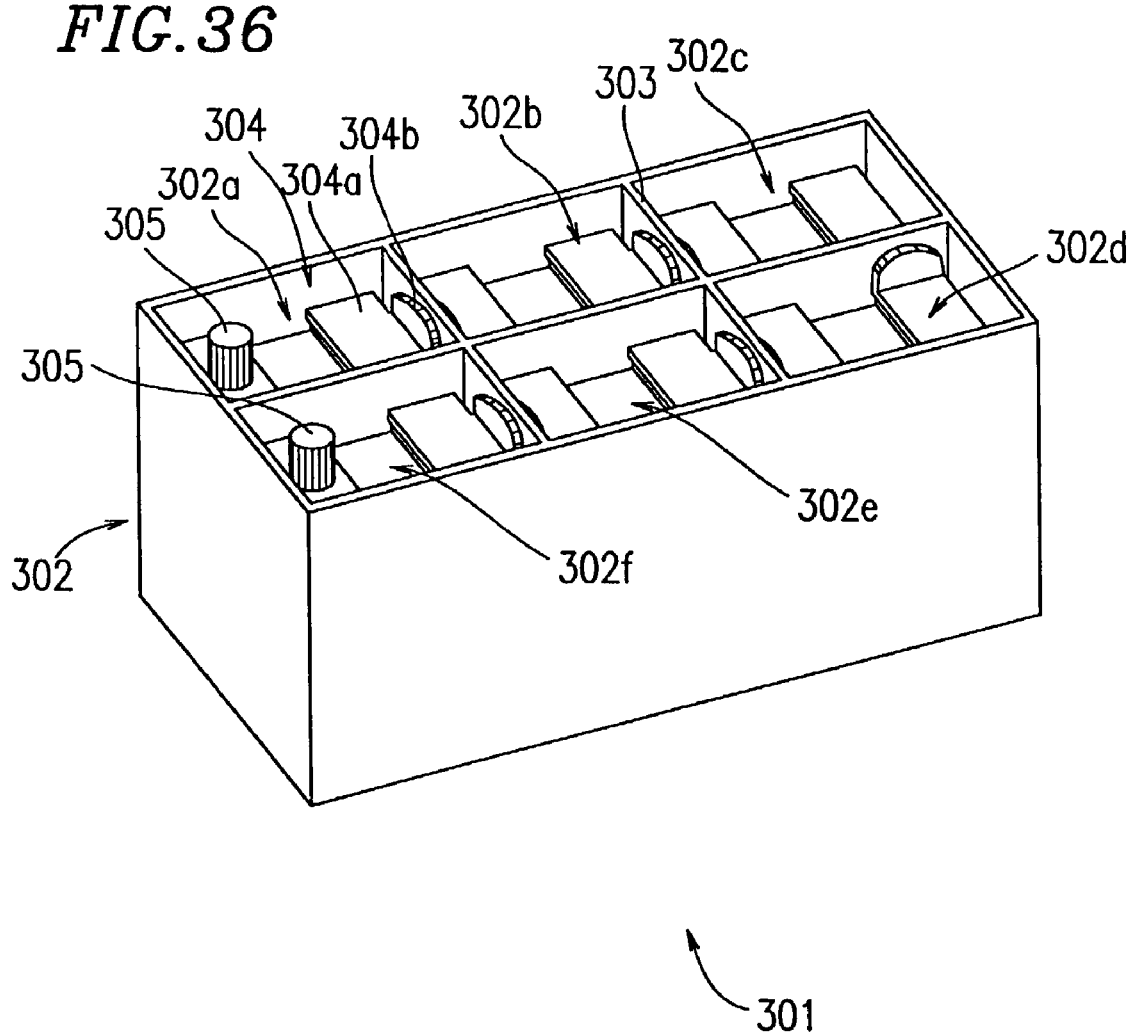
FIG. 36 is a perspective view showing a schematic configuration of a battery according to Example 2 of the present invention.

FIG. 36 is a perspective view showing a battery according to Example 2 of the present invention.

A battery 301 according to Example 2 of the present invention has a case body 302 in the shape of a hollow rectangular parallelepiped having an open top. The inner space of the case body 302 is divided with a partition 303 into first to sixth cells 302a to 302f. Specifically, the inner space of the case body 302 is divided into three portions in the longitudinal direction and into two portions in the width direction, forming the 6 cells 302a to 302f. The cells 302a to 302f each have a cross section in the shape of a rectangle elongated in the longitudinal direction of the case body 302.

The cells 302a to 302f each comprise a unit power generation element containing a plurality of positive electrode plates (e.g., $PbO_2$ plates) having a similar planar shape and a plurality of negative electrode plates (e.g., Pb plates) having a similar planar shape. In the unit power generation element, the positive electrode plates and the negative electrode plates are alternately laminated via separators made of porous, extremely fine glass fibers holding dilute sulfuric acid, or the like.

At one end of the case body 302, the first cell 302a and the sixth cell 302f are disposed side by side in a width direction of the case body 302. The first cell 302a, the second cell 302b and the third cell 302c are disposed side by side in a longitudinal direction of the case body 302. The third cell 302c and the fourth cell 302d are disposed side by side in the width direction of the case body 302. The fifth cell 302e is disposed between the fourth cell 302d and the sixth cell 302f. The positive electrode plates and the negative electrode plates of the unit power generation element of each cell 302a to 302f are each extending in the longitudinal direction of the case body 302.

All of the positive electrode plates of each unit power generation element of the second cell 302b to the fifth cell 302e (i.e., excluding the first cell 302a and the sixth cell 302f) are connected to a first strap 304 provided on one side of the positive electrode plate. All of the negative electrode plates of each unit power generation element are connected to a second strap 304 provided on a side of the negative electrode plate opposite to the first strap 304 provided on the side of the positive electrode plate. The first strap 304 is conductive to all of the positive electrode plates, while the second strap 304 is conductive to all of the negative electrode plates.

All of the positive electrode plates of the unit power generation element contained in the first cell 302a are connected to the first strap 304, while all of the negative electrode plates are connected to a terminal member 305. All of the negative electrode plates of the unit power generation element contained in the sixth cell 302f are connected to the second strap 304, while all of the positive electrode plates are connected to the terminal member 305.

Figure 39:
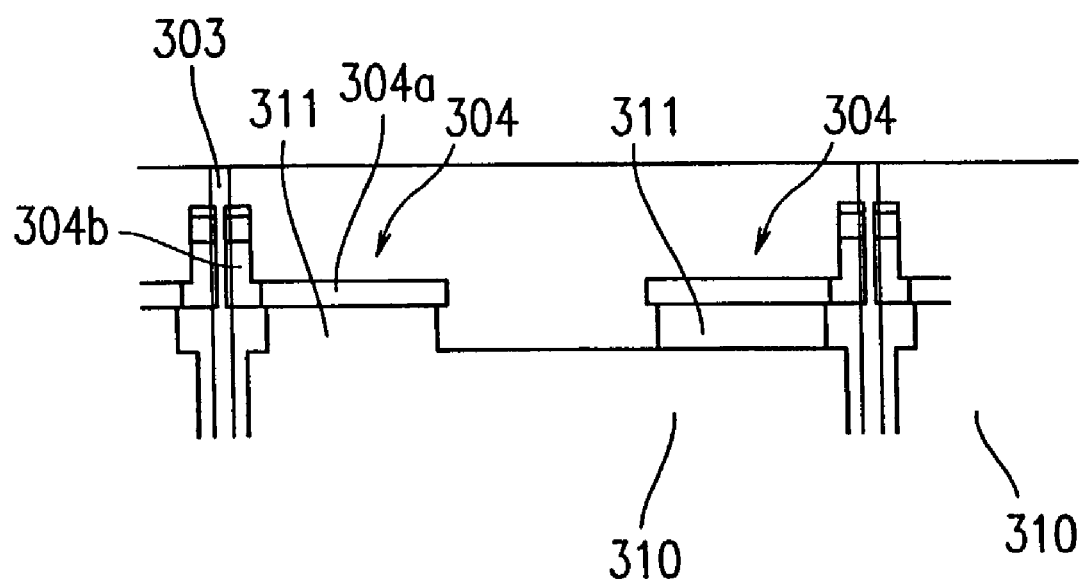
FIG. 39 is a cross-sectional view showing a unit power generation element in the cell of the battery of Example 2.

The second strap 304 connected to the negative electrode plate of the unit power generation element contained in the first cell 302a is interconnected to the first strap 304 which is connected to the positive electrode plates of unit power generation element contained in the second cell 302b via a through hole provided in the partition 303. As shown in FIG. 39, the second strap 304 connected to the negative electrode plates of the unit power generation element in the second cell 302b is interconnected to the first strap 304 connected to the positive electrode plates of the unit power generation element in the third cell 302c, via a through hole provided in the partition 303. The second strap 304 connected to the negative electrode plates of the unit power generation element in the third cell 302c is interconnected to the first strap 304 connected to the positive electrode plates of the unit power generation element in the fourth cell 302d next to the third cell 302c in the width direction of the case body 302 via a through hole provided in the partition 303.

The second strap 304 connected to the negative electrode plates of the unit power generation element in the fourth cell 302d is interconnected to the first strap 304 connected to the positive electrode plates of the unit power generation element in the fifth cell 302e, via a through hole provided in the partition 303. The second strap 304 connected to the negative electrode plates of the unit power generation element in the fifth cell 302e is interconnected to the first strap 304 of the positive electrode plates of the unit power generation element in the sixth cell 302f, via a through hole provided in the partition 303. Thus, the unit power generation elements contained in the cells 302a to 302f are connected in series. The terminal member 305 connected to the unit power generation element in the first cell 302a is a positive terminal, while the terminal member 305 connected to the unit power generation element in the sixth cell 302f is a negative terminal.

Figure 37:
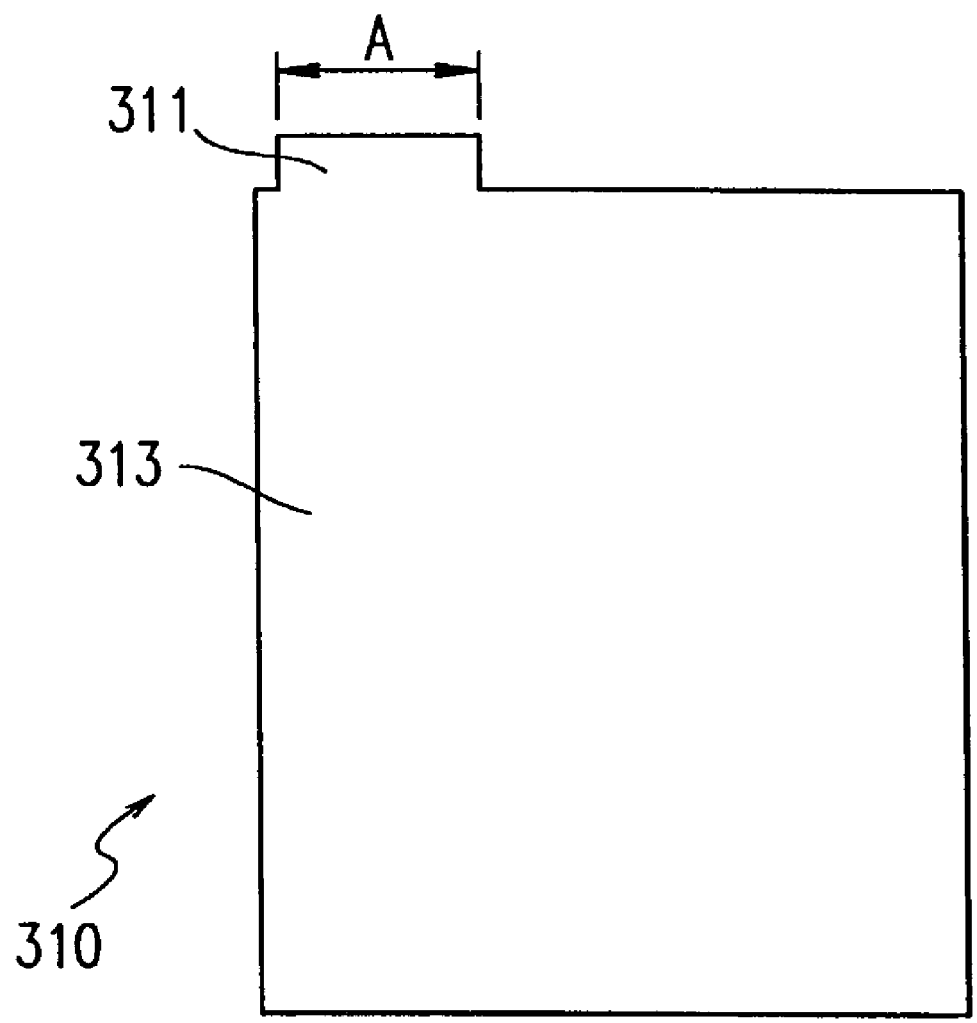
FIG. 37 is a front view of an electrode plate used in the battery of FIG. 36.

FIG. 37 is a front view of an electrode plate 310 constituting the positive electrode plate or the negative electrode plate contained in the cells 302a to 302f of the battery 301 of Example 2. The electrode plate 310 has a rectangular electrode plate body 313 and a rectangular collector 311 which is provided at a side of the electrode plate body 313 and projects from the electrode plate body 313 upward. The collector 311 is provided at the side edge of the electrode plate body 313, leaving an appropriate spacing with respect to an end of the side of the electrode plate body 313 and also leaving an appropriate spacing with respect to the center of the side of the electrode plate body 313. The collector 311 has a predetermined length of A.

Figure 38A:
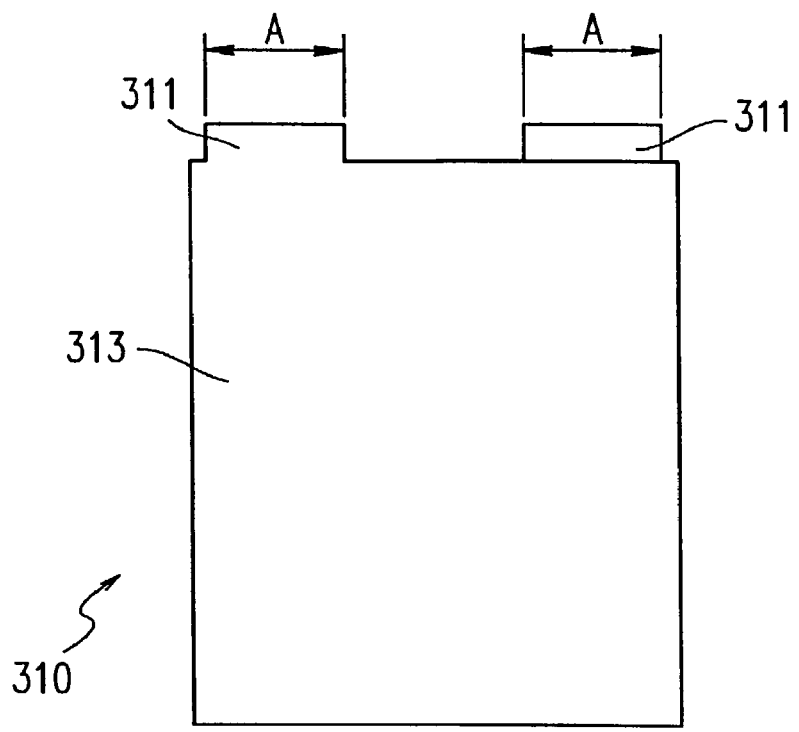
FIG. 38A is a front view showing a structure of an electrode plate used in a unit power generation element of the battery of Example 2.

The thus-constructed electrode plate 310 is used in a manner as shown in FIG. 38A. Specifically, a pair of the electrode plates 310 are attached together via a separator, where the collectors 311 are positioned on the opposite sides, i.e., one of the electrode plates 310 is turned from side to side and is then attached to the other electrode plate 310 to obtain a positive electrode plate and a negative electrode plate.

Figure 38B:
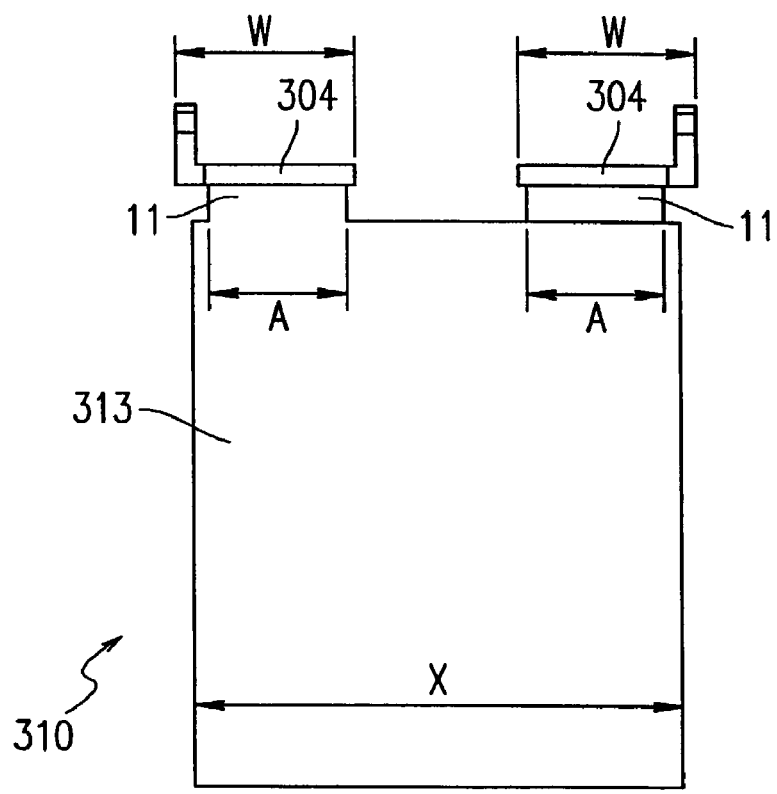
FIG. 38B is a front view showing the electrode plate with a strap.

In the unit power generation elements contained in the second cell 302b to the fifth cell 302e, as shown in FIG. 38B, one strap 304 is connected by welding to the collectors 311 of all of the electrode plates 310 constituting the positive electrode plates, while the other strap 304 is connected to the collectors 311 of all of the electrode plates 310 constituting the negative electrode plates.

In this case, the inner end side of the strap 304 is substantially continuously adjacent to the inner end side of the collector 311.

The strap 304 has an electrode plate connector 304a, which is in the shape of a plate and is attached by welding to a top edge of the collector 311 provided in the electrode plate 310, and an inter-cell connector 304b, which is bent extending upward from a side of the electrode plate connector 304a. The electrode plate connector 304a is attached by welding to the collector 311 of the electrode plate 310 constituting a positive electrode plate or a negative electrode plate, where the inter-cell connector 304b is disposed along the partition 303 provided between the adjacent cells.

The length A of the collector 311 of the electrode plate 310 is related to the length W of the electrode plate 310 along the collector 311 as follows:

$A > W/2$.

Further, the length A of the collector 311 of the electrode plate 310 is related to the length (width) X of the electrode plate body 310 along the collector 311 as follows:

$X/5 \leq W < X/2$.

Next, an example relating to the bonding strength between the unit power generation element and the strap will be described.

As the electrode plate used in the battery 301, an electrode plate 310 having an electrode plate body 313, having a height of 115 mm and a width of 100 mm, was used as a positive electrode plate or a negative electrode plate. 15 electrode plates were prepared as negative electrode plates and were arranged so that their collectors 311 were located at the same side, while 14 electrode plates were prepared as positive electrode plates and were arranged so that their collectors 311 were located on the opposite side. The negative electrode plates and the positive electrode plates were alternately laminated via separators to obtain a unit power generation element. The electrode plate connector 304a of the strap 304 at one side was attached by welding to the top edges of the collectors 311 provided on the top ends of the electrode plates 310 as positive electrode plates, while the electrode plate connector 304a of the strap 304 at the other side was attached by welding to the top edges of the collectors 311 provided on the top ends of the electrode plates 310 as negative electrode plates. The electrical capacity of the unit power generation element was assumed to be 60 Ah.

Note that the width direction length of the electrode plate body 313 along the collector 311 is represented by X, the length of the collector 311 is represented by A, and the length of the strap 304 along the collector 311 is represented by W.

The electrode plate 310 had the electrode plate body 313 in the shape of a rectangle having a constant width direction length (X) of 115 mm and a constant height of 100 mm. The width direction length A of the collector 311 and the length W of the strap 304 were changed in various ways. The unit power generation element to which a pair of straps 304 were attached were subjected to a drop test and a voltage drop test. In the drop test, the unit power generation element was dropped from a predetermined height and thereafter the amount of deformation of the strap 304 was investigated. In the voltage drop test, after the drop test, the unit power generation element was discharged for a predetermined time from the full charge state and the amount of voltage drop was measured.

In the drop test, the unit power generation element to which the straps 304 were attached was turned upside down and was dropped from a height of 1 m, and thereafter, the amount of deformation of each strap 304 was measured. The results are shown in Table 1.

TABLE 1

| Length A | Length W of strap | | | | |
|---|---|---|---|---|---|
| of collector | X/10 | X/5 | X3/10 | X2/5 | X/2 |
| W/10 | N/A | N/A | N/A | 5 | N/A |
| W/5 | N/A | 1 | 4 | 5 | N/A |
| W3/10 | N/A | 1 | 2 | 4 | N/A |
| W2/5 | 0 | 0 | 1 | 2 | N/A |
| W/2 | 0 | 0 | 0 | 0 | N/A |
| W3/5 | 0 | 0 | 0 | 0 | N/A |
| W7/10 | 0 | 0 | 0 | 0 | N/A |
| W4/5 | 0 | 0 | 0 | 0 | N/A |
| W9/10 | 0 | 0 | 0 | 0 | N/A |
| W | 0 | 0 | 0 | 0 | N/A |

N/A: The battery could not actually be produced.

Referring to Table 1, when the length A of the collector 311 was greater than ½ the length W of the strap 304 (i.e., A>W/2), the strap 304 was not substantially deformed by the drop test. In contrast, when the length A of the collector 311 was smaller than ½ the length W of the strap 304 (i.e., A<W/2), the strap 304 was sometimes deformed by the drop test. The smaller the length A of the collector 311, the greater the amount of deformation of the strap 304.

Therefore, it is preferable that the length A of the collector 311 is greater than ½ the length W of the strap 304 (i.e., A>W/2).

Note that in Table 1, when the length W of the strap 304 is equal to ½ of the width direction length X of the electrode plate body 313, the total of the lengths of a pair of strap 304 provided on the unit power generation element (W×2) is equal to the width direction length X of the electrode plate body 313. In this case, the straps 304 having such a length needed to be separated from each other on the unit power generation element, generating wasted space. Therefore, such a strap was not produced in this experiment.

When the length W of the strap 304 is equal to ¹⁄₁₀ the width direction length X of the electrode plate body 313 and the length A of the collector 311 is ¹⁄₁₀ to ³⁄₁₀ the length W of the strap 304, the length A of the collector 311 is equal to ¹⁄₁₀×¹⁄₁₀ to ³⁄₁₀×¹⁄₁₀ the width direction length X of the electrode plate body 313, i.e., about 1 mm to about 3 mm in the case of the electrode plate body 313 of 115 mm×100 mm. It is difficult to produce a collector 311 having such a small length. Such a collector 311 was not prepared in this experiment.

Further, when the length W of the strap 304 is ⅕ or 3/10 the width direction length X of the electrode plate body 313 and the length A of the collector 311 is 1/10 the length W of the strap 304, the length A of the collector 311 is very small. In this case, it is similarly difficult to produce a collector 311 having such a small length. Such a collector 311 was not prepared in this experiment.

Next, the amount of voltage drop of the unit power generation element after the drop test was measured by discharging at 240 A for 10 seconds. The results are shown in Table 2. Note that in Table 2, an amount of voltage drop, where the length W of the strap 304 is ⅖ the width direction length X of the electrode plate body 313, and the length A of the collector 311 is equal to the length W of the strap 304, is defined as a reference value (1.00).

TABLE 2

| Length A of collector | Length W of strap | | | | |
|---|---|---|---|---|---|
| | X/10 | X/5 | X3/10 | X2/5 | X/2 |
| W/2 | 1.43 | 1.16 | 1.12 | 1.10 | N/A |
| W4/5 | 1.32 | 1.09 | 1.06 | 1.03 | N/A |
| W | 1.27 | 1.05 | 1.02 | 1.00 | N/A |

N/A: The battery could not actually be produced.

Referring to Table 2, the smaller the length W of the strap 304, the greater the amount of voltage drop.

Specifically, when the length W of the strap 304 was lowered from ⅕ to 1/10 the width direction length X of the electrode plate body 313, the amount of voltage drop was particularly significant.

Therefore, according to Table 2, the length W of the strap 304 is preferably at least ⅕ the width direction length X of the electrode plate body 313 in terms of prevention of voltage drop.

In summary of the experimental results, the weight of the strap 304 or the like can be reduced while avoiding damages, such as deformation, provided that the following conditions are satisfied:

$A > W/2$, and $X/5 \leq W < X/2$ where A represents the length of the collector 311, W represents the length of the strap 304 along the collector 311, and X represents the width direction length of the electrode plate body 313. In this case, the strap 304 can be prevented from having a high resistance, that is, voltage drop due to such a high resistance can be avoided.

The battery 301 of Example 2 maybe of either an open type or a sealed type. When the battery 301 is used as a power source for an electric vehicle or the like, the sealed type, which can resist strong wobble, is preferable.

According to the present invention, it is possible to provide a battery comprising a plurality of linked cells, which has a high level of cooling efficiency for cooling the cells.

Further, according to the present invention, it is possible to provide a battery comprising a plurality of linked cells, which can cool the cells with low cost.

Furthermore, according to the present invention, it is possible to provide a battery comprising a plurality of linked cells, in which there is substantially no variation in the lives of the cells.

In the battery of the present invention, a bath is provided with a depression, and a lid is provided with a protrusion, which is to be engaged with the depression. Therefore, by simply fitting and engaging the protrusion of the lid with the depression of the bath, the lid can be correctly positioned with respect to a cooling box, so that the cells contained in the cooling box can be easily sealed.

In the battery of the present invention, the length A of a collector, the length W of a strap along the collector, and the width direction length W of an electrode plate body satisfy the relationships, $A > W/2$ and $X/5 \leq W < X/2$. Therefore, damages, such as deformation of the strap, can be avoided and the weight of the battery can be reduced. Further, the strap can be prevented from having a high resistance, that is, voltage drop due to such a high resistance can be avoided. The battery is preferably used in applications, in which the battery is strongly wobbled, such as an automobile.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A battery, comprising a plurality of cells connected in series wherein each cell comprises a unit generating element containing a plurality of positive electrode plates, negative electrode plates, and separators, wherein:

the positive electrode plates and the negative electrode plates in each cell are alternately laminated via the separators;

the positive electrode plates and the negative electrode plates each comprises an electrode plate body and a collector provided on the electrode plate body, the collector of the positive electrode plates in each cell except a last cell is attached to a positive electrode plate strap, each positive electrode plate strap being provided on one side of each cell, and the collector of the negative electrode plates in each cell except a first cell is attached to a negative electrode plate strap, each negative electrode plate strap being provided on the other side of each cell;

a length A of the collector of each electrode plate, a length W of the positive and negative electrode plate straps along the collector, and a length X of the electrode plate body satisfy:

$A > W/2$, and $X/5 \leq W < X/2$.

2. A battery according to claim 1, wherein in the last cell, the collector of the positive electrode plates is attached to a positive terminal member, and in the first cell, the collector of the negative electrode plates is attached to a negative terminal member.

\* \* \* \* \*